US010129415B2

(12) United States Patent
Morikawa

(10) Patent No.: US 10,129,415 B2
(45) Date of Patent: Nov. 13, 2018

(54) IMAGE READING APPARATUS, IMAGE FORMING APPARATUS, IMAGE READING METHOD, AND STORAGE MEDIUM

(71) Applicant: CANON KABUSHIKI KAISHA, Tokyo (JP)

(72) Inventor: Daisuke Morikawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/603,632

(22) Filed: May 24, 2017

(65) Prior Publication Data

US 2017/0353612 A1 Dec. 7, 2017

(30) Foreign Application Priority Data

Jun. 1, 2016 (JP) .................................. 2016-110133

(51) Int. Cl.
*H04N 1/04* (2006.01)
*H04N 1/00* (2006.01)
(Continued)

(52) U.S. Cl.
CPC ..... *H04N 1/00037* (2013.01); *H04N 1/00602* (2013.01); *H04N 1/00798* (2013.01);
(Continued)

(58) Field of Classification Search
CPC ........... G06K 19/06037; G06K 9/4652; H04N 1/4097; H04N 9/097
(Continued)

(56) References Cited

U.S. PATENT DOCUMENTS 8,411,317 B2 4/2013 Morikawa
9,237,256 B2 1/2016 Tanaka
(Continued)

FOREIGN PATENT DOCUMENTS

JP S62-49765 A 3/1987
JP H08-116402 A 5/1996
(Continued)

OTHER PUBLICATIONS

U.S. Appl. No. 15/603,641, filed May 24, 2017 (Inventor: Daisuke Morikawa).

*Primary Examiner* — Negussie Worku
(74) *Attorney, Agent, or Firm* — Fitzpatrick, Cella, Harper & Scinto

(57) ABSTRACT

Provided is an image reading apparatus including a line sensor including three line sensors arranged at a predetermined interval in a sub-scanning direction, and being configured to read an image of an original by the respective line sensors, which includes light receiving elements arranged in a first direction, to generate read data representing the read image, the three line sensors each including a first light receiving element configured to receive red light, a second light receiving element configured to receive blue light, and a third light receiving element configured to receive green light, which are arranged in a main scanning direction; and a reading control board. The reading control board is configured to generate a first combined flag obtained by combining results of detecting abnormal images of respective colors and a second combined flag obtained by combining results of detecting abnormal images of the respective colors.

18 Claims, 13 Drawing Sheets

(51) Int. Cl.
    *H04N 1/028*     (2006.01)
    *H04N 1/193*     (2006.01)

(52) U.S. Cl.
    CPC ......... *H04N 1/02815* (2013.01); *H04N 1/193* (2013.01); *H04N 2201/0094* (2013.01)

(58) Field of Classification Search
    USPC ........ 358/475, 514, 505, 3.26; 382/257, 275
    See application file for complete search history.

(56) References Cited

U.S. PATENT DOCUMENTS

| | | | | |
|---|---|---|---|---|
| 2005/0179954 A1* | 8/2005 | Arai | .................... | H04N 1/00002 358/3.26 |
| 2006/0066918 A1* | 3/2006 | Ishiguro | ............. | H04N 1/00002 358/474 |
| 2006/0072826 A1* | 4/2006 | Ishiguro | ............... | H04N 1/4097 382/190 |
| 2008/0137107 A1* | 6/2008 | Futami | .................... | H04N 1/121 358/1.4 |
| 2009/0002784 A1* | 1/2009 | Morikawa | .............. | H04N 1/203 358/520 |
| 2009/0009828 A1* | 1/2009 | Kagami | ............. | H04N 1/00477 358/498 |
| 2009/0034001 A1* | 2/2009 | Shiraishi | ............ | H04N 1/00002 358/2.1 |
| 2010/0046854 A1* | 2/2010 | Shimizu | .................... | G06K 9/40 382/275 |
| 2011/0242628 A1* | 10/2011 | Morikawa | ................ | H04N 1/12 358/504 |
| 2015/0281490 A1* | 10/2015 | Morikawa | .......... | H04N 1/00771 358/434 |
| 2015/0288837 A1* | 10/2015 | Morikawa | .......... | H04N 1/00729 358/474 |
| 2016/0295046 A1* | 10/2016 | Koyama | .......... | H04N 1/00779 |
| 2017/0064138 A1* | 3/2017 | Morikawa | .............. | H04N 1/401 |
| 2017/0301200 A1* | 10/2017 | Siminoff | ............ | G08B 13/196 |
| 2017/0353613 A1* | 12/2017 | Morikawa | .......... | H04N 1/00037 |

FOREIGN PATENT DOCUMENTS

| | | |
|---|---|---|
| JP | 2004-112645 A | 4/2004 |
| JP | 2005-45462 A | 2/2005 |
| JP | 2011-259430 A | 12/2011 |

* cited by examiner

IMAGE READING APPARATUS, IMAGE FORMING APPARATUS, IMAGE READING METHOD, AND STORAGE MEDIUM

BACKGROUND OF THE INVENTION

Field of the Invention

The present invention relates to an image reading apparatus configured to effectively detect, when reading an image of a target object, an abnormal image caused by a foreign matter and that does not exist in the image.

Description of the Related Art

An image reading apparatus including an automatic document feeder (hereinafter referred to as "ADF") is capable of reading an image of an original at a predetermined reading position while continuously conveying originals sheet by sheet. In this case, the reading position of the image is fixed. It is possible to achieve high-speed image reading by conveying the original at high speed. The conveyance of the original may cause dust (foreign matter), for example, paper powder, particles, or specks, to adhere to the reading position. The foreign matter adhering to the reading position becomes a cause of a defect of the read image. For example, an abnormal image (streaked image) occurs in the read image due to the foreign matter.

An image reading apparatus disclosed in Japanese Patent Application Laid-Open No. 2005-45462 is configured to acquire read data obtained when an original does not exist at a reading position, read data obtained by reading a leading edge portion and a trailing edge portion of the original, and read data obtained by reading the original excluding the leading edge portion and the trailing edge portion, and to detect an abnormal pixel due to the foreign matter that does not exist in the original image. In the above-mentioned image reading apparatus, when a pixel having the same density at a specific position along a main scanning direction at a time of the reading exists in the respective pieces of read data that have been acquired, the pixel is detected as the abnormal pixel.

An image reading apparatus described in U.S. Pat. No. 9,237,256 is configured to determine that an original has passed through a reading position based on a shadow of a leading edge of the original in its conveyance direction, and to discriminate streaked images between before and after the leading edge of the original. The image reading apparatus is configured to determine that the streaked images existing at the same position are collectively a streaked image due to a foreign matter and that the streaked images existing at different positions are streaked images due to other factors. The image reading apparatus is configured to correct the streaked image due to the foreign matter. The image reading apparatus is further configured to loosen the coincidence of the positions of the streaked images before and after the leading edge of the original, to thereby determine the existence of the streaked images at positions within a predetermined range collectively as the streaked image due to the foreign matter. The foreign matter may be caused to move due to the conveyance of the original. In this case, streaked images originally exhibited at the same position are made different from each other through the movement, resulting in a difficulty in identifying the cause of the streaked image. Meanwhile, when the foreign matter is pressed against the original, the streaked images may appear with a width larger than the original width. In this case, it is also difficult to determine whether or not the positions of the streaked images are the same. Such cases can be handled through the loosening of the coincidence of the positions of the streaked images.

Some image reading apparatus include a reading sensor including a plurality of light receiving element arrays for the respective colors of red (R), green (G), and blue (B). The light receiving element arrays are each obtained by arranging photoelectric conversion elements configured to receive light of the same color in a line. Other image reading apparatus include such a reading sensor as disclosed in Japanese Patent Application Laid-Open No. 62-49765 or Japanese Patent Application Laid-Open No. 8-116402. In Japanese Patent Application Laid-Open No. 62-49765 and Japanese Patent Application Laid-Open No. 8-116402, there are disclosed reading sensors each including light receiving element arrays each obtained by arranging photoelectric conversion elements configured to receive light of different colors in a line, and the number of the light receiving element arrays is the same as the number of colors to be received. Each of the light receiving element arrays is formed by arranging three kinds of photoelectric conversion elements configured to receive the light of R, G, and B so that adjacent elements receive the light of different colors. The photoelectric conversion elements located in the same position along a direction of arranging the light receiving element arrays are also arranged so as to receive light of different colors for the respective light receiving element arrays.

FIG. 14 is an explanatory diagram of a reading result obtained by a reading sensor including three lines of light receiving element arrays each obtained by arranging photoelectric conversion elements configured to receive light of different colors in a line. In order to read an original image through use of the reading sensor having such a configuration, read data on each of light receiving element arrays (lines L1 to L3) includes respective colors of R, B, and G as illustrated in FIG. 14. The image reading apparatus is configured to conduct processing after sorting pieces of read data on the respective light receiving element arrays by each color. When a foreign matter 701 adheres to the reading position of the middle light receiving element array (line L2), a total of three streaked images each having a width of one pixel occur in the sorted pieces of read data on the respective colors of R, G, and B due to the foreign matter 701. The streaked image is expressed by the value "1" of each of flags (flag_r, flag_g, and flag_b).

In the case where the foreign matter moves while the original is being conveyed or where the foreign matter is pressed against the original, it is difficult to determine whether or not the streaked image is ascribable to the foreign matter due to the separation of the streaked image into the respective colors. Generally, in order to determine whether a streaked image before movement and a streaked image after movement are identical or not, a criterion for a position difference between the streaked image before movement and the streaked image after movement is employed. Even when the criterion is loosened, it is still difficult to determine whether or not the streaked image is ascribable to the foreign matter as described in the above.

This inhibits the accurate correction of the streaked image. For example, assuming that the foreign matter 701 moves to the position of a foreign matter 702, the positions of the streaked images of the respective colors are made different from each other through the movement. In this case, the streaked image of the flag (flag_b) of B appears at a position shifted by three pixels. When the criterion of the positions of the streaked images is loosened within a range of two pixels, continuity of the streaked images is interrupted, resulting in a difficulty in accurately correcting the streaked image. Therefore, there is a demand for an image reading apparatus configured to accurately correct the streaked image caused by the foreign matter.

SUMMARY OF THE INVENTION

An image reading apparatus according to the present disclosure includes a reading unit configured to read an image of a target object; and a detector configured to detect an abnormal image that does not exist in the image and is caused by a foreign matter at a reading position of the reading unit, wherein: the reading unit comprises a plurality of line sensors each including a plurality of light receiving elements arranged in a first direction, the plurality of line sensors being arranged at a predetermined interval in a second direction perpendicular to the first direction, the reading unit is configured to generate read data representing the image read by the respective line sensors, and the plurality of light receiving elements comprise a first light receiving element configured to receive light of a first color and a second light receiving element configured to receive light of a second color different from the first color; and the detector comprises: an abnormal image detector configured to detect the abnormal image for each of colors based on pixels of the same color in different lines within the read data obtained by the respective plurality of line sensors; a combining unit configured to generate at least one of combined abnormal image information obtained by combining results of detecting the abnormal images of the respective colors in an area where the target object exists and combined abnormal image information obtained by combining results of detecting the abnormal images of the respective colors in an area where the target object does not exist; and a determination unit configured to determine, when the abnormal images exist within a range including the same position in the first direction in the area where the target object exists and the area where the target object does not exist based on the combined abnormal image information, that the abnormal image due to the foreign matter has occurred within the range.

Further features of the present invention will become apparent from the following description of exemplary embodiments (with reference to the attached drawings).

DESCRIPTION OF THE EMBODIMENTS

An embodiment of the present invention is described below in detail with reference to the drawings.

Overall Configuration

Figure 1:
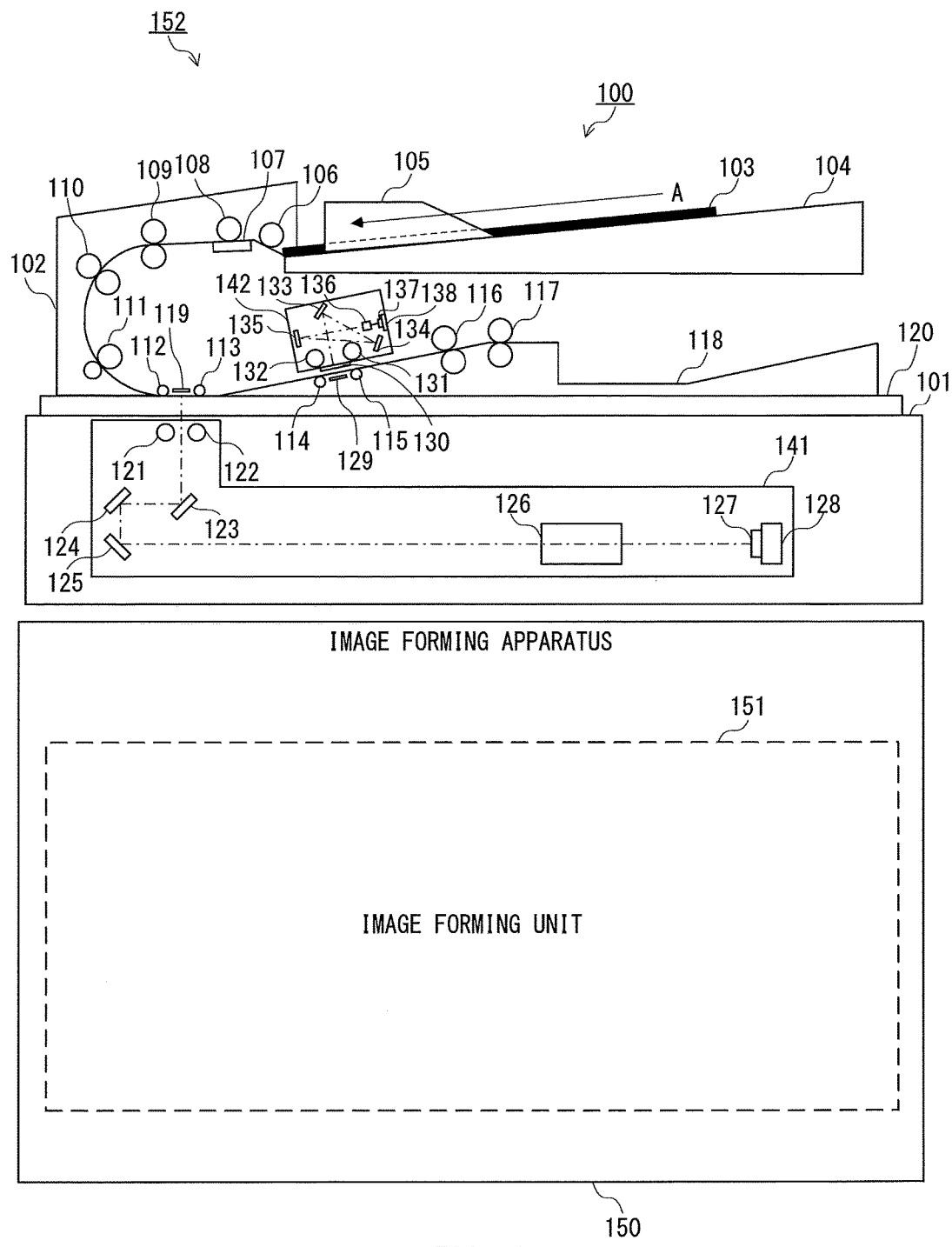
FIG. 1 is an overall configuration diagram of an image forming system.

FIG. 1 is an overall configuration diagram of an image forming system according to this embodiment. The image forming system is achieved by, for example, a digital color multifunction peripheral (MFP).

An image forming system 152 includes an image reading apparatus 100 and an image forming apparatus 150. The image forming apparatus 150 includes an image forming unit 151 configured to form an image by a known electrophotographic printing method. The image forming unit 151 includes a photosensitive member, an exposure device, a developing device, a transfer unit, and a fixing device. The exposure device is configured to form an electrostatic latent image on the photosensitive member based on image data generated by the image reading apparatus 100 reading an original 103. The developing device is configured to form a developer image on the photosensitive member by developing the electrostatic latent image formed on the photosensitive member by a developer. The transfer unit is configured to transfer the developer image formed on the photosensitive member onto a predetermined recording medium. The fixing device is configured to fix the developer image transferred onto the recording medium to the recording medium. With the above-mentioned configuration, the image forming unit 151 forms an image corresponding to the image data on the recording medium.

Configuration of Image Reading Apparatus

The image reading apparatus 100 is configured to read an original image from the original 103 being a target object of image reading. To that end, the image reading apparatus 100 includes a reader unit 101 and an ADF 102, which is an automatic original feeding device configured to feed the original 103. The reader unit 101 includes a first reading unit 141 configured to read the original image from one surface (front surface) of the original 103 at a first reading position. The ADF 102 includes a second reading unit 142 configured to read the original image from the other surface (back surface) of the original 103 at a second reading position. A reading glass 120 is provided on the reader unit 101. The ADF 102 is provided on the reading glass 120. The ADF 102 includes an original tray 104 configured to have the original 103 placed thereon. The original tray 104 includes width regulating plates 105 configured to regulate the original 103 in a direction (depth direction of FIG. 1) perpendicular to a conveyance direction (arrow A). Two width regulating plates 105 are provided so as to sandwich the original 103 placed on the original tray 104, and are configured to suppress skew feeding of the original 103. The original tray 104 allows a plurality of originals 103 to be placed thereon.

The original 103 has the image read while being conveyed from the original tray 104 along a conveyance route. On the conveyance route, in order to convey the original 103 to the first reading position, there are provided a pickup roller 106, a separation pad 107, a separation roller 108, first registration rollers 109, second registration rollers 110, first conveyance rollers 111, and second conveyance rollers 112. On the conveyance route, in order to deliver the original 103 from the first reading position to the delivery tray 118 through the second reading position, there are also provided a third conveyance roller 113, a fourth conveyance roller 114, a fifth conveyance roller 115, sixth conveyance rollers 116, and delivery rollers 117.

The pickup roller 106 is configured to convey the original 103 placed on the original tray 104 to a separator formed of the separation pad 107 and the separation roller 108. The separator is configured to separate a plurality of originals 103 sheet by sheet in order from the top of a stack of the plurality of originals 103 by the separation pad 107 and the separation roller 108. The first registration rollers 109 are configured to correct the skew feeding of one original 103 separated by the separator. The original 103 is conveyed to the first reading position through the second registration rollers 110, the first conveyance rollers 111, and the second conveyance rollers 112 in the stated order. The first reading position is set between the second conveyance rollers 112 and the third conveyance roller 113. The original 103 has the original image on one surface read by the first reading unit 141 while passing through the first reading position.

The third conveyance roller 113 is configured to convey the original 103, which has passed through the first reading position, to the second reading position. The second reading position is set between the fourth conveyance roller 114 and the fifth conveyance roller 115. The fourth conveyance roller 114 is configured to convey the original 103, which has been conveyed by the third conveyance roller 113, to the second reading position. The original 103 has the original image on the other surface read by the second reading unit 142 while passing through the second reading position. The fifth conveyance roller 115 is configured to convey the original 103, which has passed through the second reading position, to the sixth conveyance rollers 116. The sixth conveyance rollers 116 are configured to convey the original 103, which has been conveyed by the fifth conveyance roller 115, to the delivery rollers 117. The delivery rollers 117 are configured to deliver the original 103, which has been conveyed by the sixth conveyance rollers 116, to an original delivery tray 118.

The first reading unit 141 and the second reading unit 142 have the same configuration.

The first reading unit 141 includes light sources 121 and 122, reflective mirrors 123, 124, and 125, an imaging lens 126, a line sensor 127 including a light receiving element array, and a signal processing board 128. A white opposing member 119 is provided at a position opposed to the first reading unit 141 across the first reading position. The original 103, which has been conveyed to the first reading position, passes through a position between the white opposing member 119 and the reading glass 120. The first reading unit 141 is configured to cause the light sources 121 and 122 to apply light to the original 103 passing through the first reading position. The original 103 reflects the applied light. The reflected light is guided to the imaging lens 126 through the reflective mirrors 123, 124, and 125. The imaging lens 126 is configured to image the reflected light onto a light receiving surface of the line sensor 127. The line sensor 127 is configured to input an electric signal, which is an analog signal corresponding to the reflected light received on the light receiving surface, to the signal processing board 128. The signal processing board 128 is configured to process the electric signal input from the line sensor 127 to generate read data being a digital signal representing the image on the front surface of the original 103.

The second reading unit 142 includes light sources 131 and 132, reflective mirrors 133, 134, and 135, an imaging lens 136, a line sensor 137 including a light receiving element array, and a signal processing board 138. A white opposing member 129 and a back surface reading glass 130 are provided at the second reading position. The original 103, which has been conveyed to the second reading position, passes through a position between the white opposing member 129 and the back surface reading glass 130. The second reading unit 142 is configured to cause the light sources 131 and 132 to apply light to the original 103 passing through the second reading position. The original 103 reflects the applied light. The reflected light is guided to the imaging lens 136 through the reflective mirrors 133, 134, and 135. The imaging lens 136 is configured to image the reflected light onto a light receiving surface of the line sensor 137. The line sensor 137 is configured to input an electric signal, which is an analog signal corresponding to the reflected light received on the light receiving surface, to the signal processing board 138. The signal processing board 138 is configured to process the electric signal input from the line sensor 137 to generate read data being a digital signal representing the image on the back surface of the original 103.

The light sources 121, 122, 131, and 132 are formed by arranging a plurality of light emitting elements, for example, light emitting diodes (LEDs). The plurality of light emitting elements are arranged in a direction perpendicular to the conveyance direction of the original 103. The line sensors 127 and 137 each include a light receiving element array forming a line by arranging a plurality of light receiving elements (photoelectric conversion elements). The light receiving element is a complementary metal oxide semiconductor (CMOS) sensor, a charge coupled device (CCD) sensor, or the like. The light receiving element array is arranged in the same direction as a direction of arranging the light emitting elements. The direction of arranging the light receiving element array corresponds to a main scanning direction of the first reading unit 141 and the second reading unit 142.

The line sensors 127 and 137 of this embodiment each include a plurality of light receiving element arrays each obtained by arranging a plurality of light receiving elements configured to receive light of different colors, which is described later in detail. For example, a light receiving element configured to receive the light of R (first color), a light receiving element configured to receive the light of G (second color), and a light receiving element configured to receive the light of B (third color) are arranged in one line. Adjacent ones of the light receiving elements receive the light of different colors. In the line sensors 127 and 137, the above-mentioned plurality of light receiving element arrays are arranged in a sub-scanning direction perpendicular to the main scanning direction. In this embodiment, three light receiving element arrays are arranged in the sub-scanning direction. The light receiving element arrays are arranged so that the light receiving elements adjacent in the sub-scanning direction receive the light of different colors as well.

The first reading unit 141 is used to read the image of the front surface of the original 103 at the first reading position and to read the image of the original 103 placed on the reading glass 120. In order to read the image of the original 103 placed on the reading glass 120, the light sources 121 and 122 and the reflective mirrors 123, 124, and 125 of the first reading unit 141 are moved in the left-right direction of FIG. 1. Therefore, the light sources 121 and 122 and the reflective mirrors 123, 124, and 125 are integrally formed.

Control System of Image Reading Apparatus 100

Figure 2:
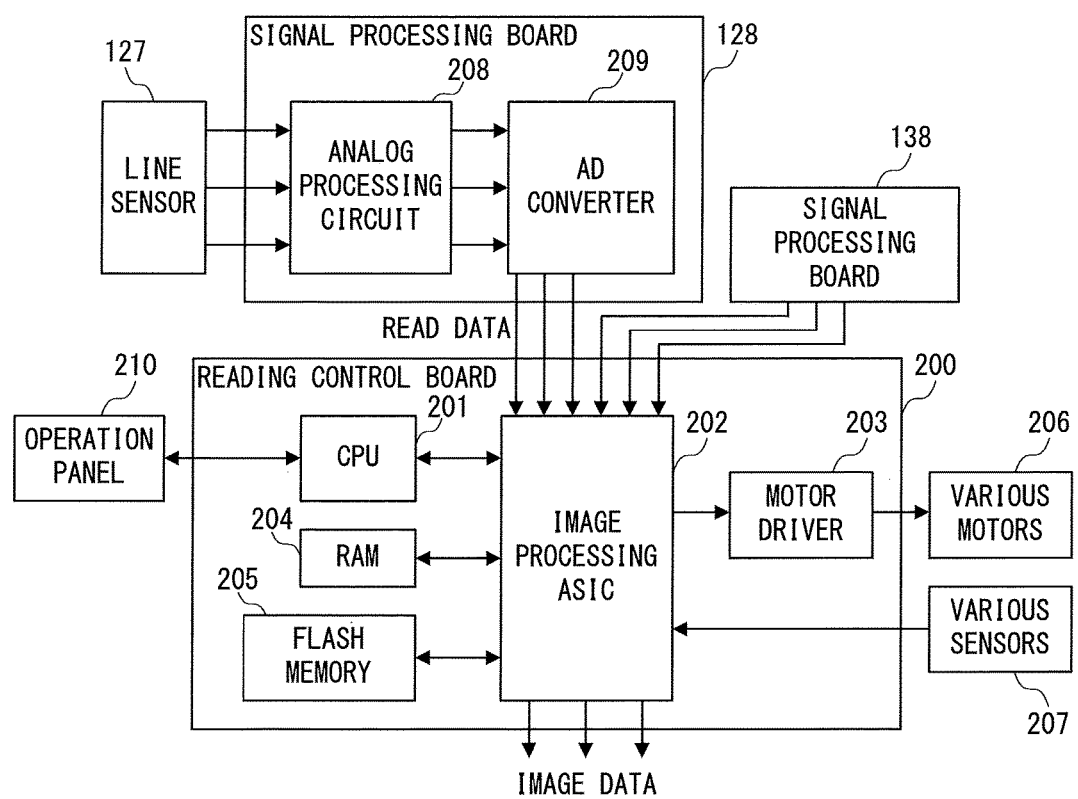
FIG. 2 is a configuration diagram of a control system.

FIG. 2 is a configuration diagram of a control system for controlling an operation of the image reading apparatus 100. The control system includes the signal processing boards 128 and 138 and a reading control board 200, which are provided to the first reading unit 141 and the second reading unit 142, respectively. The reading control board 200 is built into the image reading apparatus 100, and is capable of communicating to/from the image forming apparatus 150. The signal processing board 128 and the signal processing board 138 have the same configuration. Therefore, in FIG. 2, the configuration of the signal processing board 138 is illustrated in a simplified manner.

The signal processing board 128 includes an analog processing circuit 208 and an AD converter 209. The analog processing circuit 208 is configured to acquire an electric signal from the line sensor 127. As described above, the line sensor 127 is configured to receive the reflected light from the original 103 on the light receiving surface, and to output the electric signal being the analog signal obtained by photoelectrically converting the received reflected light. The electric signal has a value corresponding to a reflected light amount. The analog processing circuit 208 is configured to subject the acquired electric signal to analog processing, for example, offset adjustment or gain adjustment. The analog processing circuit 208 transmits the electric signal subjected to the analog processing to the AD converter 209. The AD converter 209 is configured to convert the electric signal acquired from the analog processing circuit 208 into the read data being the digital signal. The AD converter 209 is configured to transmit the generated read data to the reading control board 200. In the same manner as the signal processing board 128, the signal processing board 138 is configured to generate the read data being the digital signal from the electric signal being the analog signal output from the line sensor 137, and to transmit the read data to the reading control board 200.

The first reading unit 141 and the second reading unit 142 are each configured to conduct the reading operation after immediately before the original 103 is conveyed to the reading position until the original 103 has passed through the reading position. Therefore, the read data includes the image of the white opposing member 119 or 129 obtained before the original 103 reaches the reading position together with the image of the original 103.

The reading control board 200 is connected to an operation panel 210, various motors 206 included in the image reading apparatus 100, and various sensors 207 included in the image reading apparatus 100. The operation panel 210 is a user interface to be operated by a user. The operation panel 210 is used for not only input to the reading control board 200 but also display of a message for the user or other such purpose. To that end, the operation panel 210 includes input/output devices, for example, an input button, a touch panel, and a display. The reading control board 200 is configured to execute reading processing or other such processing based on a signal input from the operation panel 210. The reading control board 200 is configured to display, by the operation panel 210, a warning urging cleaning when foreign matter adhering to the reading position is detected, for example. The reading control board 200 is configured to conduct drive control for the various motors 206 based on detection results obtained by the various sensors 207, and to conduct the reading processing for an original image.

The reading control board 200 is a computer system including a central processing unit (CPU) 201, an image processing application specific integrated circuit (ASIC) 202, a motor driver 203, a random access memory (RAM) 204 being a volatile memory, and a flash memory 205 being a nonvolatile memory. The RAM 204 is formed of, for example, a synchronous dynamic random access memory (SDRAM). The CPU 201 is configured to read a computer program from the flash memory 205, a read only memory (ROM) (not shown), or other such storage medium, and to execute the computer program with the RAM 204 being used as a work area, to thereby control the operation of the image reading apparatus 100. The CPU 201 is configured to make various operation settings for the image processing ASIC 202.

The image processing ASIC 202 is configured to conduct various kinds of image processing for the read data acquired from the signal processing boards 128 and 138 based on contents of the settings made by the CPU 201. The image processing ASIC 202 is configured to temporarily store the read data in the RAM 204 at a time of the image processing. Various setting values and parameters to be used when the image processing ASIC 202 conducts the image processing are stored in the flash memory 205. The image processing ASIC 202 is configured to conduct the image processing by acquiring the setting values and parameters from the flash memory 205 as the need arises.

Figure 14:
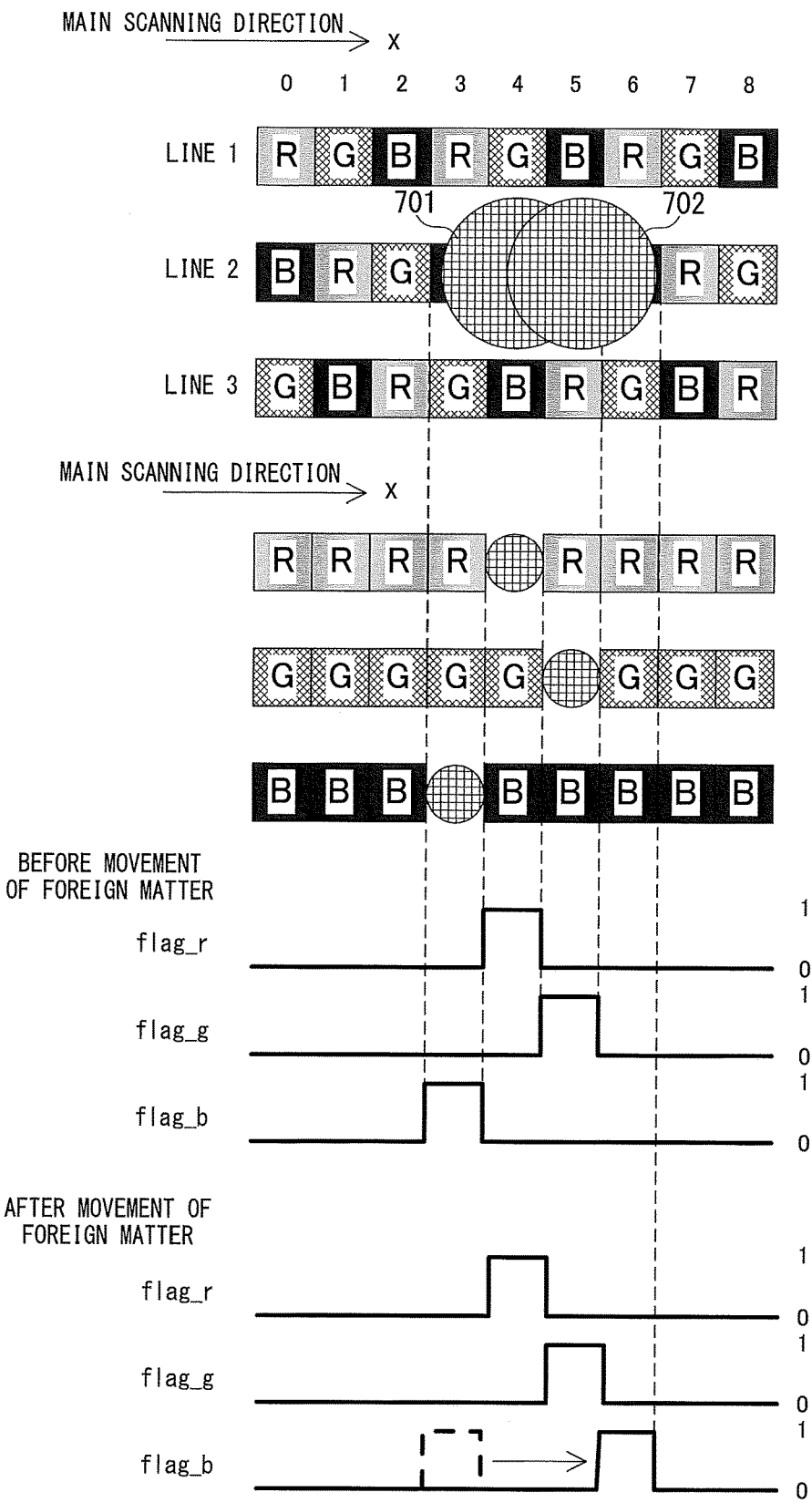
FIG. 14 is an explanatory diagram of a reading result.

The image processing ASIC 202 of this embodiment detects, from the read data, an abnormal image caused when dust or other such foreign matter adheres to the reading position. The abnormal image appears as an image (streaked image) having a shape of a streak extending in a sub-scanning direction. As illustrated in FIG. 14, the streaked image of each color appears as an image having a width of one pixel based on the configuration of the line sensor 127 or 137.

The reading processing for an original image is started with a trigger of a reading instruction issued through the operation panel 210 or one of the detection results obtained by the various sensors 207. The CPU 201 and the image processing ASIC 202 input control signals for controlling operations of the various motors 206 through the motor driver 203 at a time of the reading processing for an original image. The image processing ASIC 202 conducts the image processing for the read data acquired from the signal processing boards 128 and 138, and generates the image data representing the original image. The image processing ASIC 202 transmits the generated image data to the image forming apparatus 150. The image forming apparatus 150 is capable of conducting the image forming processing based on the image data acquired from the image processing ASIC 202.

Line Sensor

Figure 3A:
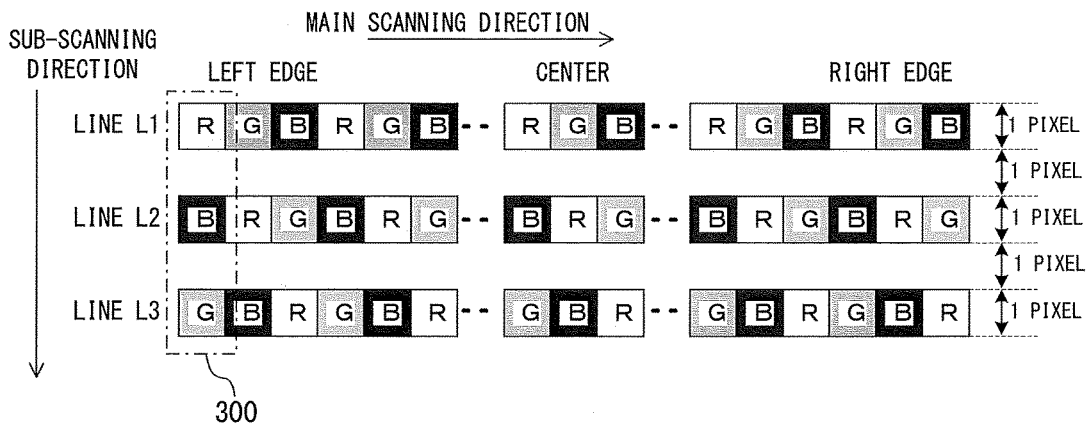
FIG. 3A, FIG. 3B, and FIG. 3C are explanatory diagrams of a line sensor.
Figure 3B:
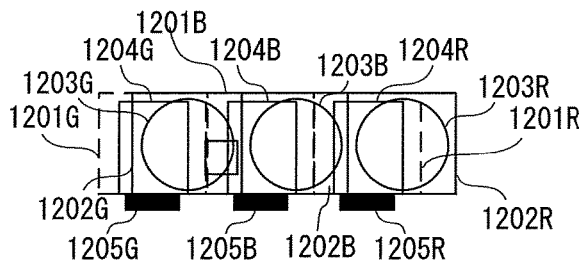
Figure 3C:
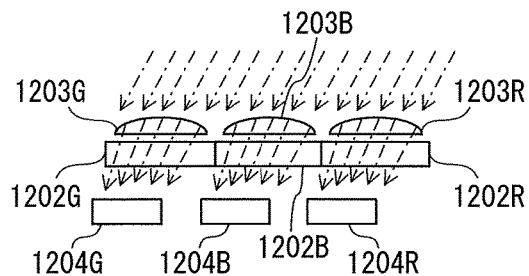

FIG. 3A, FIG. 3B, and FIG. 3C are explanatory diagrams of the line sensors 127 and 137.

FIG. 3A is the explanatory diagram of a structure of the line sensors 127 and 137 in which the light receiving element arrays are arranged. The line sensors 127 and 137 are configured to read 7,500 pixels in the main scanning direction being a first direction, and to read three lines in the sub-scanning direction being a second direction perpendicular to the first direction. The following description is made on the assumption that an image is read with a resolution of 600 dots per inch (dpi) in the main scanning direction, but the resolution is merely an example. The main scanning direction represents a direction in which a plurality of light receiving elements are arranged in a line, and a direction corresponding to a width direction (direction perpendicular to the conveyance direction) of the original at a time of reading the original. The sub-scanning direction represents a direction perpendicular to the main scanning direction, and a direction corresponding to the conveyance direction of the original at the time of reading the original. An array formed of the light receiving element array in the first direction (main scanning direction) is referred to as "line". One line is formed of one light receiving element array. In each of the line sensors 127 and 137, a plurality of lines (in this case, three lines) of the light receiving element arrays each forming one line are arranged at a predetermined interval in the second direction (sub-scanning direction) perpendicular to the first direction (main scanning direction).

Three lines L1 to L3 of the light receiving element arrays are spaced apart from each other at a predetermined interval in the sub-scanning direction, and are arranged so that a leading pixel 300 existing in a cycle of R→G→B has a color different from that of another leading pixel 300 within the adjacent array. In the example of FIG. 3A, the interval between adjacent lines is one pixel. Therefore, the line L1 and the line L2 of the light receiving element arrays are arranged in positions spaced apart from each other by two pixels in the sub-scanning direction, and the line L1 and the line L3 of the light receiving element arrays are arranged in positions spaced apart from each other by four pixels in the sub-scanning direction. The leading pixel 300 of the line L1 has the color of red (R). The leading pixel 300 of the line L2 has the color of green (G) that is different from R by one pixel. The leading pixel 300 of the line L3 has the color of blue (B) that is different from G by one pixel. In short, the colors of the pixels have regularity of R→G→RG→B→ . . . in the main scanning direction. When viewed in the sub-scanning direction, the line L1 and the line L2 are arranged with the above-mentioned regularity being shifted by one pixel in the main scanning direction. The line L1 and the line L3 are arranged with the above-mentioned regularity being shifted by two pixels in the main scanning direction. Therefore, in the line sensors 127 and 137, the respective light receiving elements for R, G, and B are arranged in a so-called staggered shape. In short, first light receiving elements, second light receiving elements, and third light receiving elements are arranged so that light receiving elements configured to detect pixels of the same color are not adjacent to each other. The line sensors 127 and 137 are each configured to detect and output signals in positions spaced apart from each other by the above-mentioned number of pixels in order to read the original 103.

FIG. 3B and FIG. 3C are configuration diagrams of light receiving elements. Now, a description is made of configurations of a light receiving element 1201R configured to receive red light, a light receiving element 1201B configured to receive blue light, and a light receiving element 1201G configured to receive green light. The light receiving elements 1201R, 1201B, and 1201G each correspond to one pixel, and are normally arranged at regular intervals.

The light receiving element 1201R includes a light transmitting member 1202R configured to transmit light having a predetermined wavelength (wavelength of the red light) as light having a peak transmittance wavelength and an optical semiconductor element 1204R configured to output an electric signal having a level corresponding to the intensity of the light transmitted through the light transmitting member 1202R. The light receiving element 1201B includes a light transmitting member 1202B configured to transmit light having a predetermined wavelength (wavelength of the blue light) as light having a peak transmittance wavelength and an optical semiconductor element 1204B configured to output an electric signal having a level corresponding to the intensity of the light transmitted through the light transmitting member 1202B. The light receiving element 1201G includes a light transmitting member 1202G configured to transmit light having a predetermined wavelength (wavelength of the green light) as light having a peak transmittance wavelength and an optical semiconductor element 1204G configured to output an electric signal having a level corresponding to the intensity of the light transmitted through the light transmitting member 1202G.

The light transmitting members 1202R, 1202B, and 1202G are color filters each configured to transmit a corresponding color (for example, red color for R). The optical semiconductor elements 1204R, 1204B, and 1204G are, for example, photodiodes. The peak transmittance wavelength represents a wavelength with which the filter exhibits the maximum transmittance. Each of the optical semiconductor elements 1204R, 1204B, and 1204G for one pixel is formed to be smaller than the corresponding one of the light transmitting members 1202R, 1202B, and 1202G. The optical semiconductor elements 1204R, 1204B, and 1204G and the light transmitting members 1202R, 1202B, and 1202G are insulated by an interlayer film formed of a silicon oxide or other such insulating material. When the optical semiconductor elements 1204R, 1204B, and 1204G are elements capable of receiving the corresponding colors by themselves, it is unnecessary to provide the light transmitting members 1202R, 1202B, and 1202G.

The light receiving elements 1201R, 1201B, and 1201G include micro lenses 1203R, 1203B, and 1203G, respectively, each configured to condense reflected light. The reflected light condensed by the micro lenses 1203R, 1203B, and 1203G is imaged onto light receiving surfaces of the optical semiconductor elements 1204R, 1204B, and 1204G through the light transmitting members 1202R, 1202B, and 1202G, respectively. The micro lenses 1203R, 1203B, and 1203G are configured so that a stain or the like is prevented from adhering thereto by a cover glass (not shown).

The light receiving elements 1201R, 1201B, and 1201G include gate electrodes 1205R, 1205B, and 1205G in the optical semiconductor elements 1204R, 1204B, and 1204G, respectively. The gate electrodes 1205R, 1205B, and 1205G serve as terminals for outputting electric signals from the optical semiconductor elements 1204R, 1204B, and 1204G, respectively, to the signal processing board 128. The gate electrodes 1205R, 1205B, and 1205G are formed of, for example, polysilicon.

The line sensors 127 and 137 each have such a configuration, and hence the read data generated in one line includes the respective colors of R, G, and B. The image processing ASIC 202 is inconvenient for image processing in the subsequent stage as it is, and is therefore configured to generate sorted data obtained by sorting pieces of read data generated by the respective three lines L1 to L3 for every pixel of the same color. For example, the pieces of read data are sorted as illustrated in FIG. 14. The image processing ASIC 202 is configured to conduct the following processing relating to the detection of the streaked image based on the sorted data.

Detection of Streaked Image

The dust or other such foreign matter, which adheres to the first or second reading position, the light receiving element of the line sensor 127 or 137, an optical system including a mirror or a lens of the first reading unit 141 or the second reading unit 142, the reading glass 120, or the like, causes a streaked image (abnormal image) by being read. The streaked image is an image that does not originally exist in the original image. It is noted that the image reading apparatus 100 cannot discriminate whether the streaked image is derived from the foreign matter or whether the streaked image is a ruled line or other such image existing in the original image from the beginning. In particular, when the original 103 is read while being conveyed by the ADF 102, the first reading unit 141 or the second reading unit 142 reads the foreign matter adhering to the first or second reading position, to thereby cause a streaked image continuously extending from the leading edge of the original image in the sub-scanning direction to the trailing edge. The image reading apparatus 100 is required to accurately detect the streaked image derived from the foreign matter from the read original image, and to remove the streaked image through image correction or the like.

The foreign matter adhering to the first or second reading position does not always become the streaked image. For example, when the foreign matter leaves the reading position due to the conveyance of the original 103, or when the foreign matter adheres to a position hidden behind the original 103 when viewed from the first reading unit 141 or the second reading unit 142 at a time of the reading, the streaked image due to the foreign matter does not appear.

The image processing ASIC 202 first detects abnormal pixels in a main scanning direction, and then determines continuity of the abnormal pixels in the sub-scanning direction, to thereby determine that there is a streaked image at the position of the continuous abnormal pixels. The image processing ASIC 202 sets the abnormal pixels in the main scanning direction as streaked image candidates. The determination of the streaked image candidate is conducted through difference comparison between a luminance value of a pixel of interest being a determination target and a background luminance value. A background luminance value BGR is calculated by Expression (1) in units of blocks defined by separating the read image every predetermined pixel width (for example, every sixty-four-pixel width) in the main scanning direction.

$$\text{(background luminance value } BGR\text{)}=(MAX24-MAX8)/16 \quad (1)$$

where MAX24 represents the added value of the top twenty-four pixels in descending order of the luminance value within one block, and MAX8 represents the added value of the top eight pixels in descending order of the luminance value.

The background luminance value BGR is an average value of the luminance values of sixteen pixels corresponding to a difference between MAX24 and MAX8. The background luminance value BGR is calculated by Expression (1) instead of being calculated as an average value of the luminance values of the respective pixels within one block, to thereby set the background luminance value BGR with high accuracy while suppressing specular reflection components of the white opposing members 119 and 129 provided to the reading positions and an influence other than the foreign matter. The specular reflection components of the white opposing member 119 or 129 are included in MAX8. The influence other than the foreign matter is included in MAX24.

When the background luminance value BGR, a luminance value KD of the pixel of interest, and a threshold value SSH for streaked image determination satisfy Expression (2), the image processing ASIC 202 determines the pixel of interest as the streaked image candidate. The determination result is stored in the memory within the image processing ASIC 202.

$$ABS(BGR-KD)>SSH \quad (2)$$

where ABS(BGR-KD) represents the absolute value of (BGR-KD).

Figure 4:
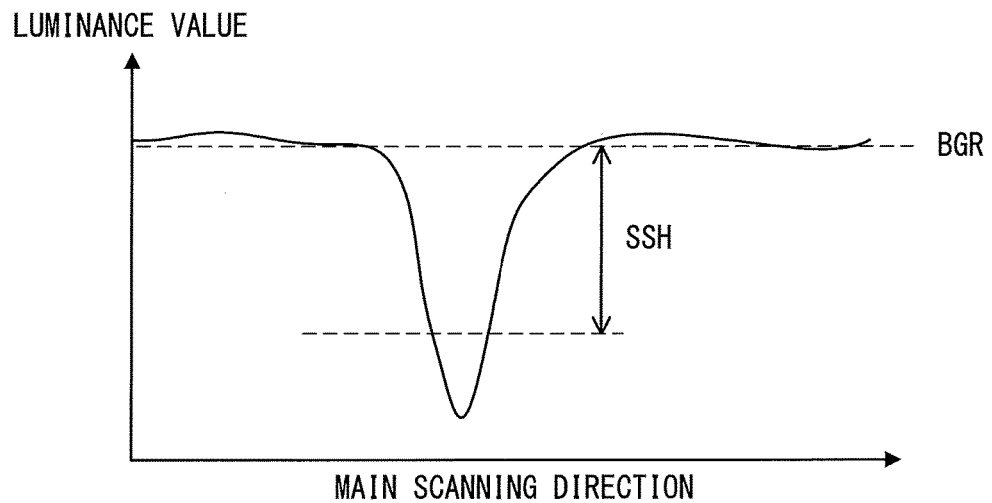
FIG. 4 is an explanatory graph of a concept of streaked image determination.

FIG. 4 is an explanatory graph of a concept of the streaked image determination. When differences between the luminance values of pieces of sorted data (pixels of interest) indicated by the solid line and the background luminance value BGR are larger than the threshold value SSH for the streaked image determination, those pixels of interest are determined as the streaked image candidates. The image processing ASIC 202 conducts such processing for determining the streaked image candidate on a plurality of lines in the sub-scanning direction, and stores the determination result in the memory every time. The image processing ASIC 202 counts the streaked image candidates at the position (pixel) in the main scanning direction among the streaked image candidates stored in the memory, and when the streaked image candidates for a predetermined number or more of lines are counted, determines that the pixels at the relevant position in the main scanning direction are collectively the streaked image. The predetermined number of lines is a determination threshold value for determining presence or absence of the streaked image. The image processing ASIC 202 determines that the streaked image of the continuous abnormal pixels has occurred at the relevant position in the main scanning direction along the sub-scanning direction. In this manner, the image processing ASIC 202 detects the abnormal image.

Figure 5:
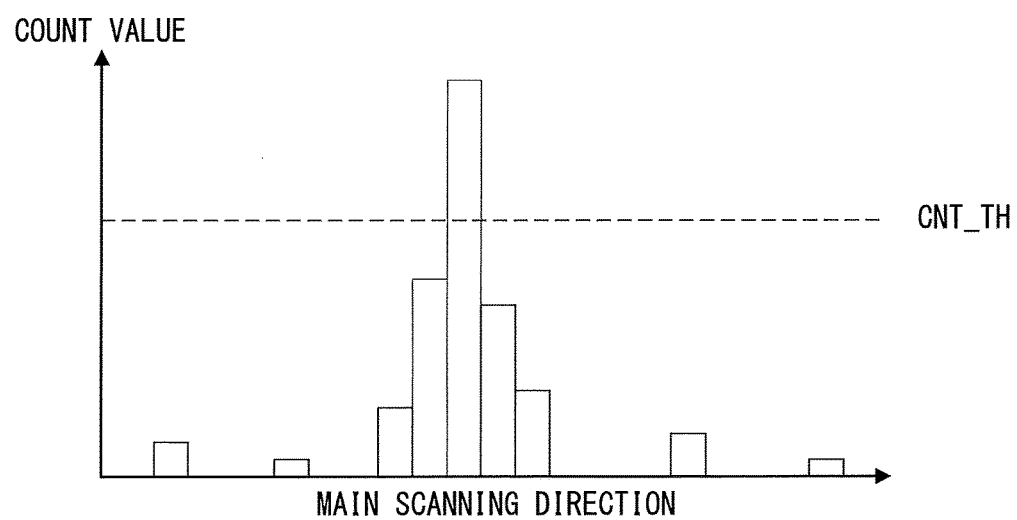
FIG. 5 is an explanatory graph of a count value of streaked image candidates.

FIG. 5 is an explanatory graph of a count value of the streaked image candidates. The count value of the streaked image candidates at each of the pixels arranged in the main scanning direction is expressed by a bar chart. The image processing ASIC 202 determines that the streaked image has occurred in the sub-scanning direction at the pixel having the bar in the bar chart exceeding a determination threshold value CNT_TH for determining the presence or absence of the streaked image.

Shadow Detection

At a time of reading the original 103, a shadow occurs at a boundary between the original 103 and the white opposing member 119 or 129 being a background of the original 103. The image processing ASIC 202 uses the shadow to determine the continuity of the streaked images along the sub-scanning direction. When the streaked images continue in the sub-scanning direction before and after the shadow, the image processing ASIC 202 recognizes the continuous streaked images collectively as the streaked image to be corrected.

Depending on an adhesion position of the foreign matter, there is a case where the foreign matter is recognized as the streaked image before the reading of the original 103 but is not recognized as the streaked image at the time of reading the original 103. For example, the foreign matter adhering to the position hidden behind the original 103 at the time of reading is not recognized as the streaked image at the time of reading the original 103. Therefore, when even an image recognized as the streaked image only before the reading of the original 103 is handled as the streaked image to be corrected, the original image read normally is unnecessarily overcorrected. In order to prevent such overcorrection, the streaked image to be corrected and the streaked image that is not to be corrected are discriminated through the detection of the shadow of the original 103.

The shadow of the original 103 is determined assuming that, for example, the background luminance value obtained from the white opposing member 119 or 129 at a specific position in the sub-scanning direction within a sheet gap (area in which the original 103 does not exist) between the originals 103 when the original images are continuously read is set as a shadow determination criterion value. When the difference value between the background luminance value obtained from a line of interest to be subjected to shadow detection and the shadow determination criterion value exceeds a predetermined value (shadow determination threshold value), the image processing ASIC 202 determines that the shadow exists in the line of interest. The background luminance value of the line of interest is an average value of luminance values obtained in units of blocks defined by separating the line in the main scanning direction every predetermined pixel width (for example, sixty-four-pixel width) at a time of detecting the streaked image.

The shadow is determined by Expression (3).

$$BGR[0]-BGR[x]>KSH \qquad (3)$$

where BGR[0] represents a shadow determination criterion value, BGR[x] represents the background luminance value of the line of interest, x represents a position in the sub-scanning direction, and KSH represents a shadow determination threshold value.

Figure 6:
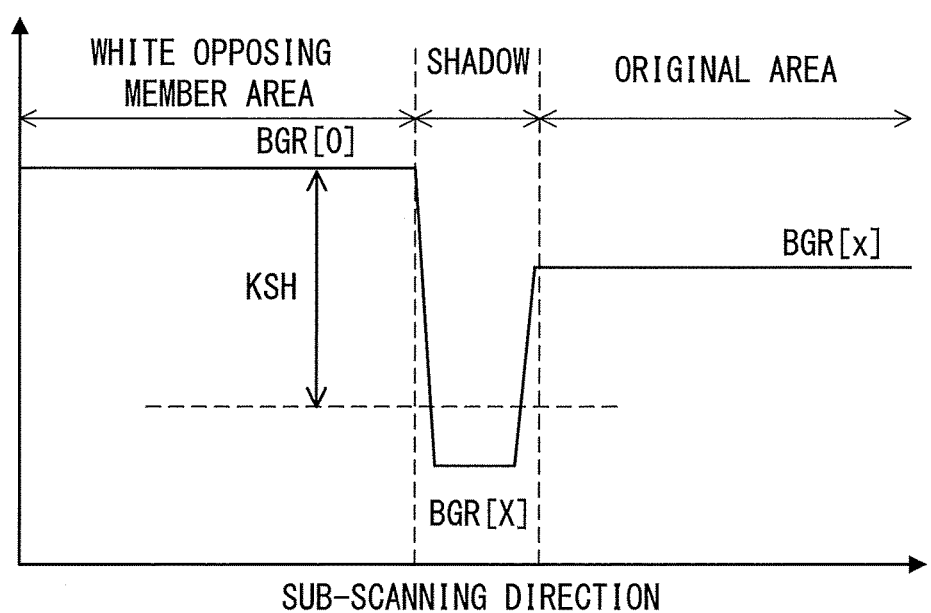
FIG. 6 is an explanatory graph of shadow detection.

FIG. 6 is an explanatory graph of such shadow detection. As shown in FIG. 6, when the background luminance value BGR[x] of the line of interest indicated by the solid line falls below a value smaller than the shadow determination criterion value BGR[0] by the shadow determination threshold value KSH, the line of interest is determined as a shadow.

Comparison of Widths of Streaked Images

The image processing ASIC 202 compares a result of detecting the streaked image at the sheet gap with a result of detecting the streaked image at a leading edge of the original 103 in the conveyance direction (leading edge in the sub-scanning direction) through the detection of the streaked image and the shadow detection, to thereby determine the continuity of the streaked images. However, when the continuity is determined strictly in units of one pixel, a harmful influence may be exerted on the determination of the streaked image to be corrected. For example, in a case where the position of the foreign matter is shifted in the main scanning direction by one pixel while the original 103 is being conveyed, a case where the line sensor 127 or 137 falls out of focus, a case where the streaked image appears to be blurred due to vibrations of the ADF 102, or other such cases, there occur variations in width of the read streaked image in the main scanning direction. When the continuity of the streaked images is determined in units of one pixel without such variations in width being taken into consideration, the streaked images originally supposed to be corrected may be determined to have no continuity, and may be excluded from subjects to be corrected.

Figure 7:
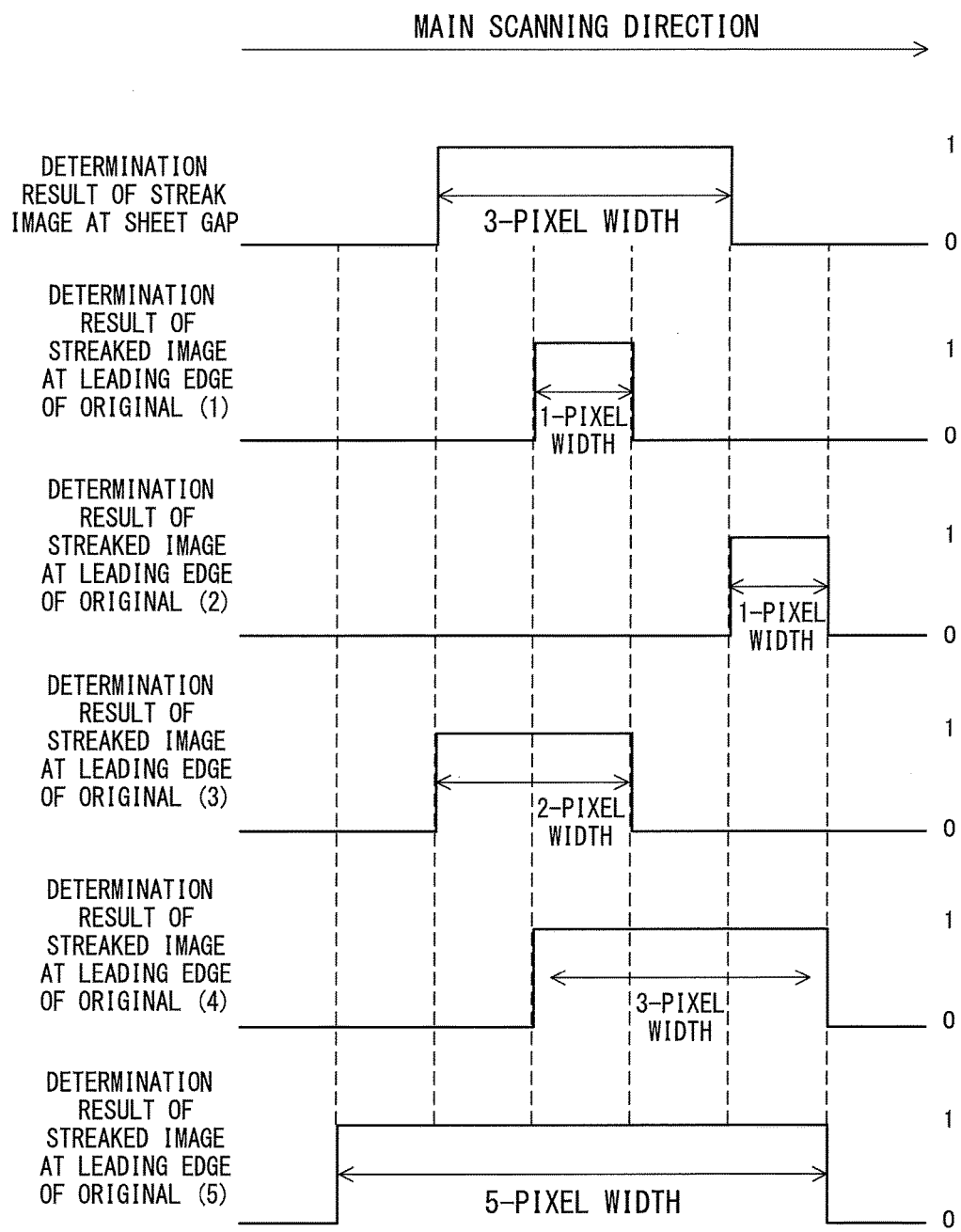
FIG. 7 is an explanatory diagram of continuity determination for streaked images.

Therefore, the continuity between the position of the streaked image in the main scanning direction which is detected at the sheet gap and the position of the streaked image in the main scanning direction which is detected at the leading edge of the original 103 in the conveyance direction is determined with enough margins for the positions and widths of the streaked images, to thereby be able to determine the streaked images with high accuracy. FIG. 7 is an explanatory diagram of continuity determination for streaked images, which is conducted in consideration of the width of each streaked image. In FIG. 7, the determination result of the streaked image at the leading edge of the original 103 in the conveyance direction and the determination results of the streaked images at the sheet gap are illustrated in units of positions (pixels) in the main scanning direction. The streaked image is expressed by "1".

In FIG. 7, it is determined that a streaked image having a three-pixel width exists at the leading edge of the original 103 in the conveyance direction. A determination result (1) of the streaked image at the sheet gap indicates that a streaked image having a one-pixel width exists at a position included in the streaked image at the leading edge of the original 103 in the conveyance direction. Determination results (3) to (5) of the streaked images at the sheet gap each indicate that a streaked image exists so as to include at least a part of the streaked image at the leading edge of the original 103 in the conveyance direction. In such a case, the image processing ASIC 202 determines that the continuity of the streaked images exists. This is an exemplary case where there have occurred variations in width of the streaked image at the leading edge of the original 103 in the conveyance direction.

A determination result (2) of the streaked image at the sheet gap indicates that the streaked image having a one-pixel width exists at a position that does not include the streaked image at the leading edge of the original 103 in the conveyance direction. The image processing ASIC 202 determines that the streaked images have no continuity because the streaked images have different positions and different widths. The image processing ASIC 202 conducts such determination in order to prevent a harmful influence of the overcorrection conducted as a result of recognizing the continuity of the streaked images in the case of the determination result (2).

In this case, the accuracy of the determination of the streaked image is increased by allowing the width of the streaked image within a range that has been empirically confirmed to have no harmful influence instead of simply allowing the width of up to a predetermined pixel width.

Streaked Image Detection Processing

Figure 8:
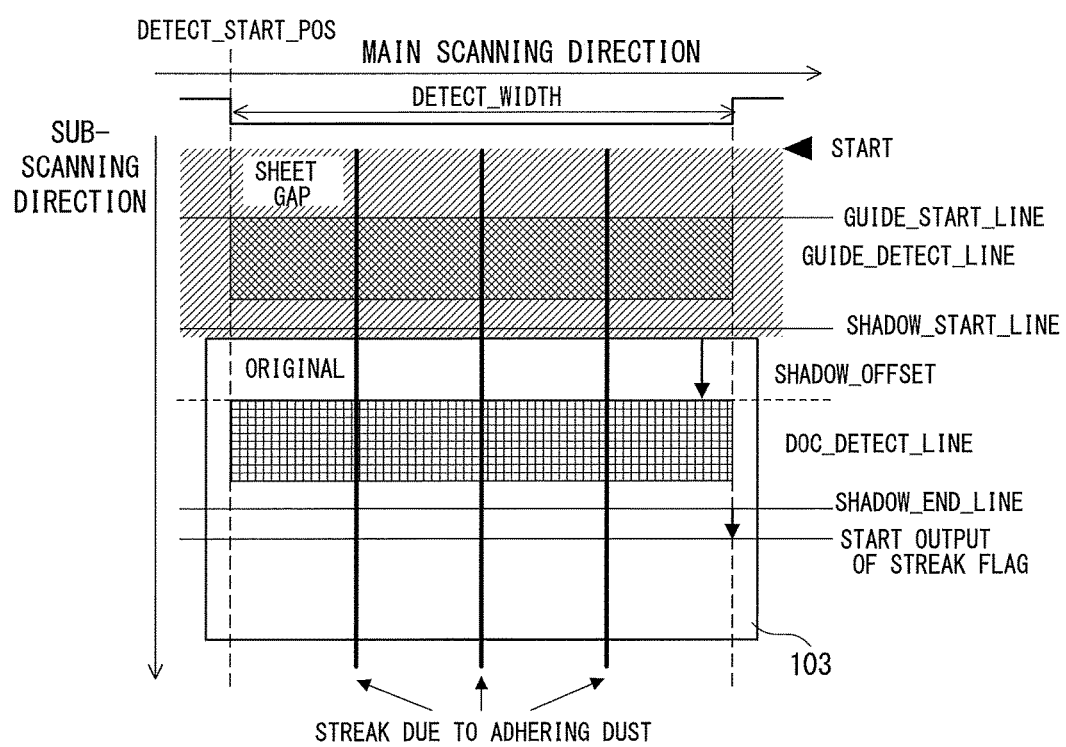
FIG. 8 is an explanatory diagram of an execution range of streaked image detection processing.
Figure 9:
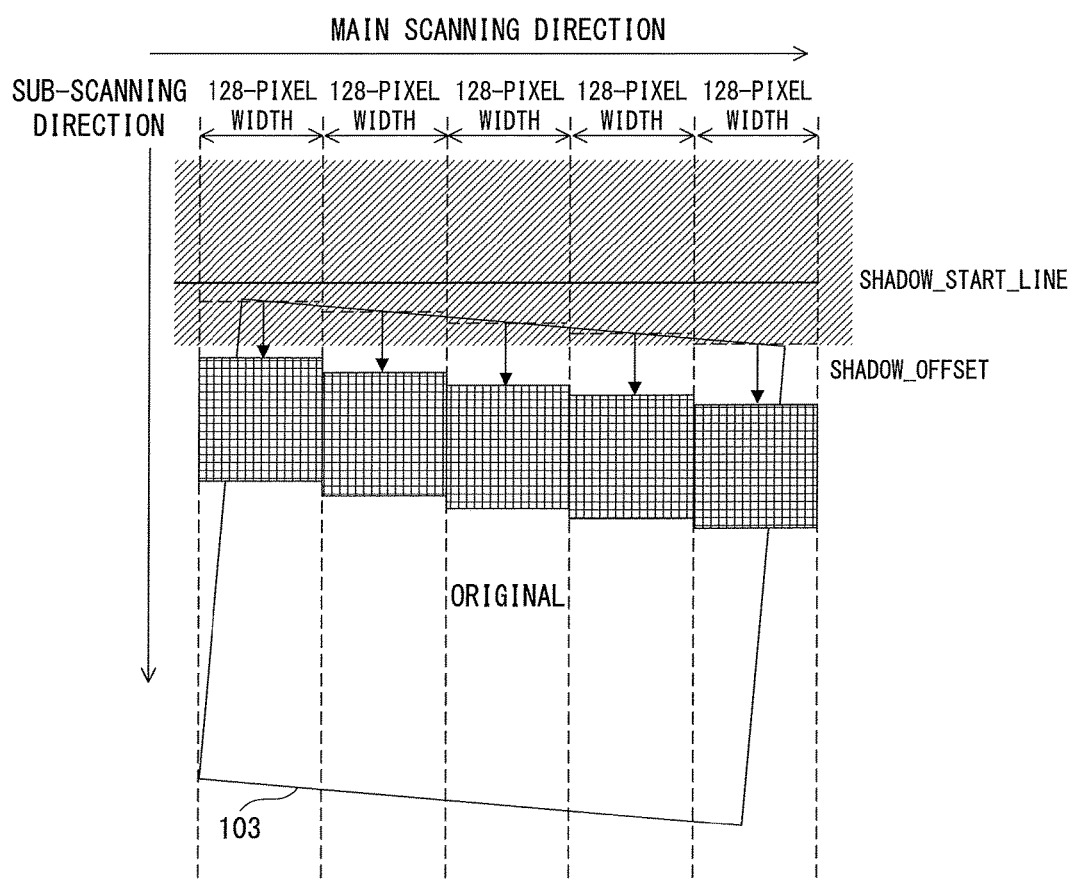
FIG. 9 is an explanatory diagram of the execution range of the streaked image detection processing.

FIG. 8 and FIG. 9 are each an explanatory diagram of an execution range of streaked image detection processing. FIG. 8 is an illustration of the execution range at a time of image reading in an ideal state under which the conveyance direction of the original 103 and the main scanning direction of the first reading unit 141 and the second reading unit 142 are perpendicular to each other. FIG. 9 is an illustration of the execution range at the time of the image reading in a state under which the conveyance direction of the original 103 and the main scanning direction of the first reading unit 141 and the second reading unit 142 are not perpendicular to each other due to skew feeding of the original 103 or for other such reason.

The image processing ASIC 202 detects the streaked image within a range of a detection range DETECT_WIDTH from a start position DETECT_START_POS in the main scanning direction. This range is set shorter than a length of the original 103 in the main scanning direction.

The image processing ASIC 202 detects the streaked image from a start position START in the sub-scanning direction. The position in the sub-scanning direction is referred to as "line" in the following description. The image processing ASIC 202 detects the streaked image in the sub-scanning direction during the passage of a number of lines GUIDE_DETECT_LINE from a line position GUIDE_START_LINE for starting reading the image of the white opposing member 119 or 129 at the sheet gap. The image processing ASIC 202 starts detecting the shadow from a line position SHADOW_START_LINE in the sub-scanning direction. The image processing ASIC 202 waits for the passage of a number of offset lines SHADOW_OFFSET after the shadow detection in the sub-scanning direction, and then starts detecting the streaked image at the leading edge of the original 103 in the conveyance direction. The image processing ASIC 202 detects the streaked image at the leading edge of the original 103 in the conveyance direction during the passage of a number of lines DOC_DETECT_LINE in the sub-scanning direction. The image processing ASIC 202 ends detecting the streaked image at a position SHADOW_END_LINE in the sub-scanning direction.

As illustrated in FIG. 9, the image processing ASIC 202 uses a predetermined pixel width in the main scanning direction as one block to detect the streaked image and to detect the shadow. When the conveyance direction and the main scanning direction are not perpendicular to each other due to the skew feeding of the original 103 or for other such reason, a line in the sub-scanning direction where the shadow has been detected at the left edge in FIG. 9 and a line in the sub-scanning direction where the shadow has been detected at the right edge in FIG. 9 differ from each other. Therefore, even when the detection of the streaked image in the image of the leading edge of the original 103 in the conveyance direction is started immediately after the shadow is detected at the left edge, the image at the sheet gap may be still being read at the right edge. It is also conceivable that the state of the leading edge of the original 103 in the conveyance direction is a punch hole, a tear, a fold, or other such poor state.

In such a case, the detection of the streaked image at the leading edge of the original 103 in the conveyance direction is started with an offset corresponding to a predetermined number of lines in the sub-scanning direction being defined starting from the position where the shadow has been detected, to thereby enable highly accurate determination of the streaked image from which influences of the skew feeding of the original 103, the deterioration of the state, and the like are eliminated. To that end, the number of offset lines SHADOW_OFFSET is defined after the shadow detection as illustrated in FIG. 8 and FIG. 9.

When a plurality of originals set in the image reading apparatus 100 have different sheet sizes, the detection range DETECT_WIDTH in the main scanning direction is set based on the sheet size assumed to be the largest. The sheet size is estimated through the shadow detection. In this case, no shadow is detected at the edge portion of the original 103 having a sheet size smaller than the detection range DETECT_WIDTH. In an edge portion area in which no shadow is detected, the shadow detection is continuously conducted to fail to shift to the processing for detecting the streaked image on the original 103, which inhibits the processing from being brought to an end. In such a case, in order to forcedly bring a series of processing for detecting the streaked image to an end, the position SHADOW_END_LINE is defined as illustrated in FIG. 8.

Figure 10:
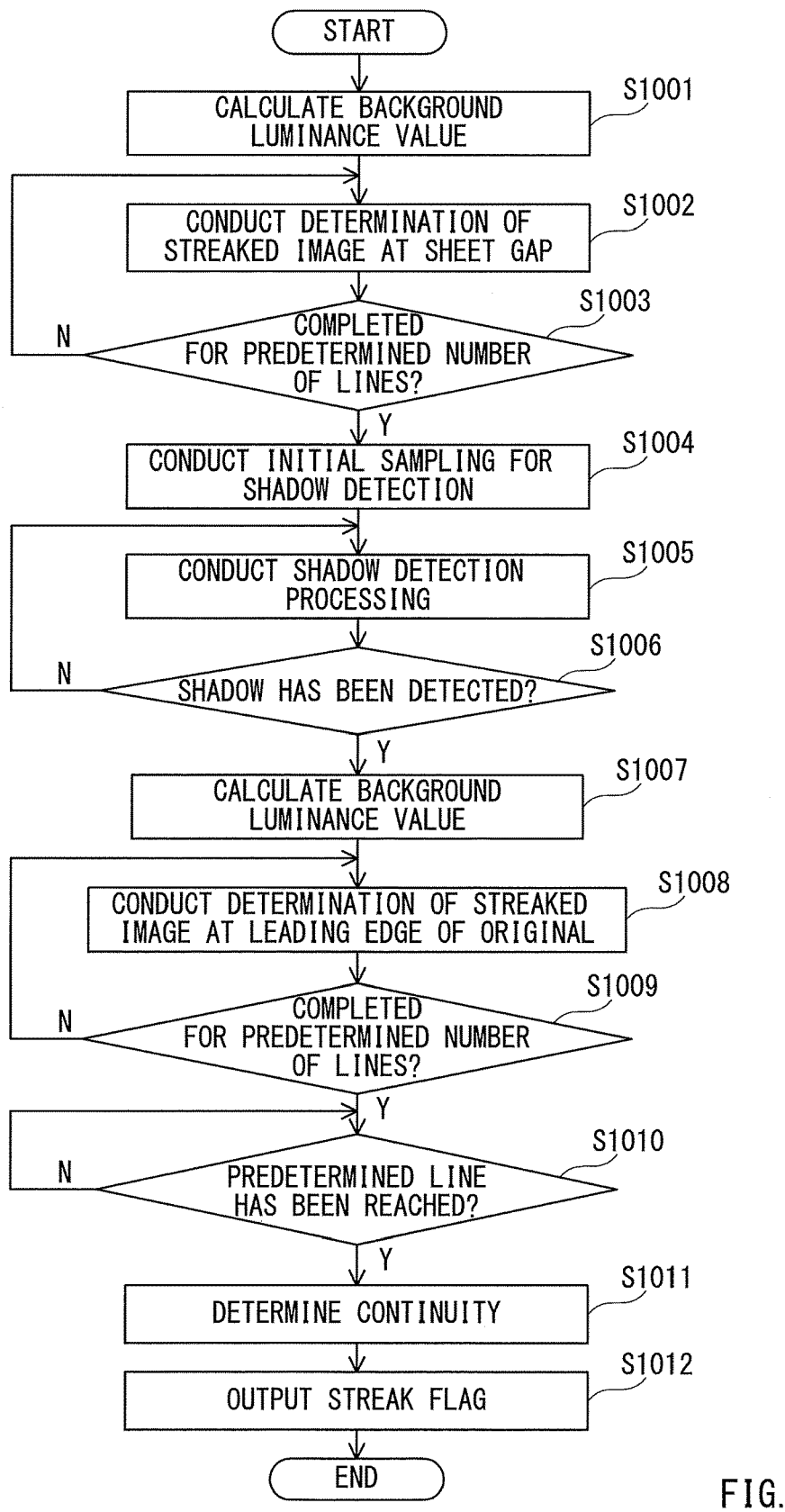
FIG. 10 is a flowchart for illustrating processing for detecting the streaked images.

FIG. 10 is a flowchart for illustrating the processing for detecting the streaked image. This processing is conducted by the reading control board 200 acquiring the read data from the first reading unit 141 or the second reading unit 142. This processing is conducted for each block in the main scanning direction, which is illustrated in FIG. 9, in order from the head in the sub-scanning direction. The image processing ASIC 202 generates the sorted data obtained by sorting the pieces of read data for every pixel of the same color. The following processing is conducted based on the sorted data.

The image processing ASIC 202 calculates the background luminance value to be a determination criterion for the streaked image at the sheet gap from the image of the white opposing member 119 or 129 at the sheet gap (Step S1001). This processing is processing conducted at the line position GUIDE_START_LINE of FIG. 8. This processing is repeatedly conducted up to the number of lines GUIDE_DETECT_LINE, and the background luminance value is updated every time. The determination criterion for the streaked image is constantly updated based on the background luminance value, which enables the highly accurate determination of the streaked image. The image processing ASIC 202 repeatedly conducts the determination of the streaked image candidates at the sheet gap and the count processing for the streaked image candidates in the sub-scanning direction during the number of lines GUIDE_DETECT_LINE from the line position GUIDE_START_LINE (Step S1002). When the streaked image candidates continuously extend in the sub-scanning direction by the number equal to or larger than the determination threshold value CNT_TH, the image processing ASIC 202 determines that a streaked image has occurred at the relevant position (pixel) in the main scanning direction.

When the processing of Step S1002 is completed up to the number of lines GUIDE_DETECT_LINE (Y in Step S1003), the image processing ASIC 202 samples an image to be the criterion for the shadow detection (Step S1004). The image to be sampled is an image corresponding to one line in the main scanning direction. This processing is processing conducted at the line position SHADOW_START_LINE of FIG. 8. The processing of Step S1001 to Step S1004 is conducted for every block in the main scanning direction of FIG. 9 irrespective of the sheet size of the original 103.

The image processing ASIC 202 compares the line of interest to be the determination target with the image to be the criterion for the shadow detection, which is sampled in Step S1004, and determines whether or not the line of interest is a shadow (Step S1005). The image processing ASIC 202 repeatedly conducts the detection as to whether or not the line of interest is a shadow until the shadow is detected (N in Step S1006). The processing of Step S1005 produces detection results that are different in units of blocks due to the skew feeding of the original 103 or for other such reason.

When the shadow is detected (Y in Step S1006), the image processing ASIC 202 calculates the background luminance value to be the determination criterion for the streaked image at the leading edge of the original 103 in the conveyance direction (Step S1007). This processing is processing conducted in the line offset by the number of offset lines SHADOW_OFFSET of FIG. 8 from the line in which the shadow has been detected. This processing is repeatedly conducted up to the number of lines DOC_DETECT_LINE, and the background luminance value is updated every time. The determination criterion for the streaked image is constantly updated based on the background luminance value, which enables the highly accurate determination of the streaked image. The image processing ASIC 202 conducts the determination of the streaked image candidates at the leading edge of the original 103 in the conveyance direction and the count processing for the streaked image candidates in the sub-scanning direction (Step S1008). When the streaked image candidates continuously extend in the sub-scanning direction by the number equal to or larger than the determination threshold value CNT_TH, the image processing ASIC 202 determines that a streaked image has occurred at the relevant position (pixel) in the main scanning direction. The image processing ASIC 202 repeatedly conducts the processing during the number of lines DOC_DETECT_LINE from the line offset by the number of offset lines SHADOW_OFFSET from the line in which the shadow has been detected (Step S1009).

When the processing of Step S1008 is completed up to the number of lines DOC_DETECT_LINE (Y in Step S1009), the image processing ASIC 202 determines whether or not the position in the sub-scanning direction is the position SHADOW_END_LINE (Step S1010). When the position in the sub-scanning direction is the position SHADOW_END_LINE (Y in Step S1010), the image processing ASIC 202 brings the detection of the streaked image to an end. At this point in time, the states of all the blocks in the main scanning direction are fixed. The image processing ASIC 202 brings the detection of the streaked image to an end at the position SHADOW_END_LINE even when the detection of the streaked image is being conducted or when there remains a block being subjected to the shadow detection.

The image processing ASIC 202 compares the result of detecting the streaked image at the sheet gap with the result of detecting the streaked image at the leading edge of the original 103 in the conveyance direction, and determines the continuity of the streaked images at the sheet gap and the leading edge of the original 103 in the conveyance direction at each position (pixel) in the main scanning direction (Step S1011). Determination processing for the continuity is described later. The image processing ASIC 202 generates a streak flag indicating the presence or absence of a streaked image at each position (pixel) in the main scanning direction based on the determination result of the continuity of the streaked images (Step S1012). The image processing ASIC 202 generates the streak flag with a pixel for a continuous streaked image being set to "1" and a pixel for a discontinuous streaked image being set to "0". The reading control board 200 generates image data by correcting the sorted data based on the streak flag generated by the image processing ASIC 202, and transmits the image data to the image forming apparatus 150.

Now, three patterns of the processing for determining the continuity, which are conducted in Step S1011, are described as examples. In any one of the patterns of the processing, the image processing ASIC 202 uses the flag indicating the result of detecting the streaked image and having one bit allocated to each pixel in the main scanning direction. The image processing ASIC 202 generates, for each color, a first flag indicating the result of detecting the streaked image at the sheet gap, which is conducted in Step S1002, and a second flag indicating the result of detecting the streaked image at the leading edge of the original 103 in the conveyance direction, which is conducted in Step S1008. For example, the first flag and the second flag are set to "1" for the pixel determined to be the streaked image and to "0" for the pixel that is not determined to be the streaked image. The image processing ASIC 202 compares the first flag and the second flag with each other, and when the streaked image exists at substantially the same position (pixel) in the main scanning direction, determines that the streaked images continuously extend between the sheet gap and the leading edge of the original 103 in the conveyance direction. In the processing of Step S1012, the streak flag indicating that the streaked image due to the foreign matter exists at the relevant pixel is output.

First Pattern of Processing for Determining Continuity

Figure 11:
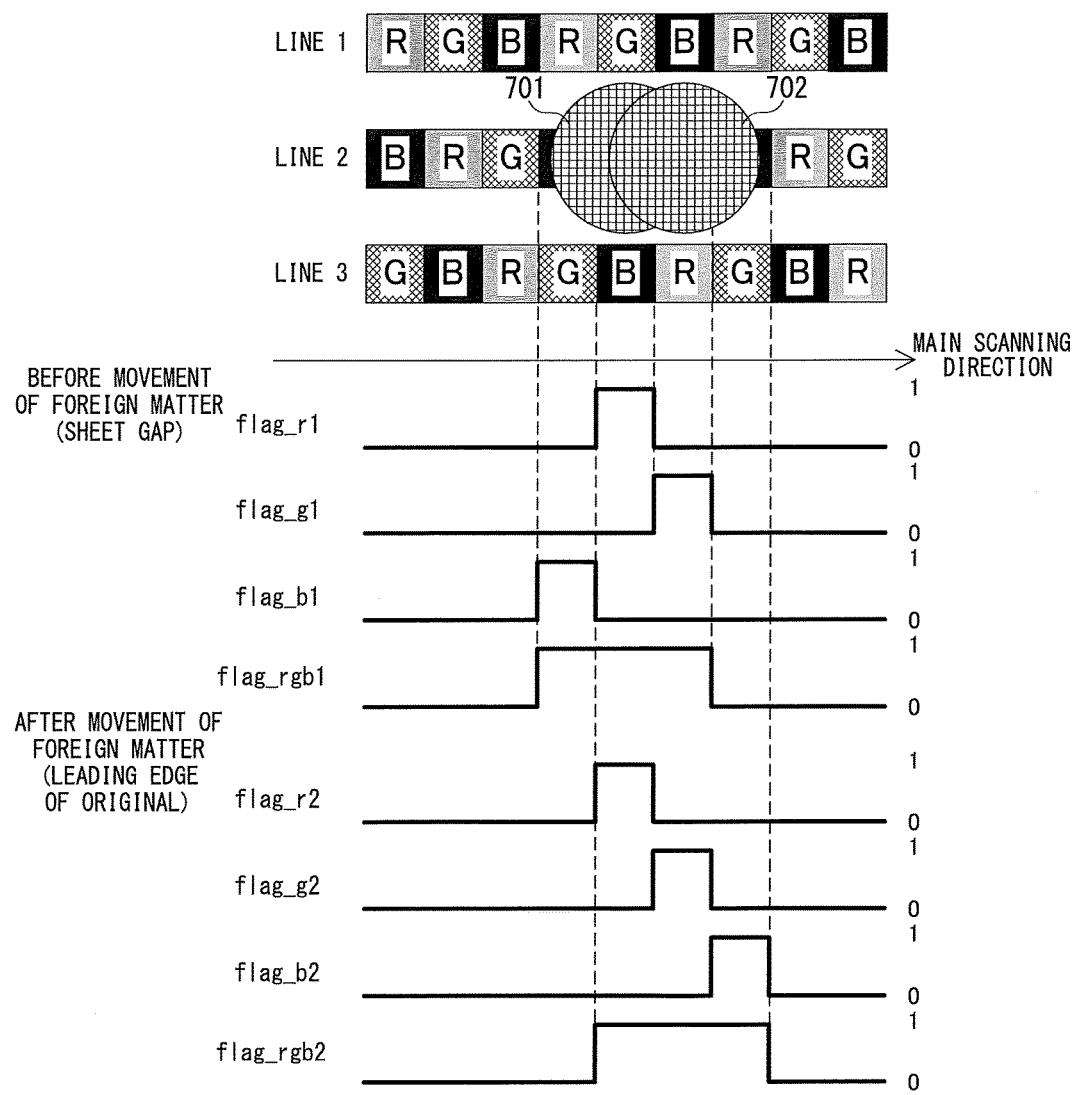
FIG. 11 is an explanatory diagram of the continuity determination for streaked images.

FIG. 11 is an explanatory diagram of the continuity determination for streaked images. In this case, a description is made of a case where the position of the foreign matter 701 at which the sheet gap is read moves to the position of the foreign matter 702 when the original 103 is read.

The image processing ASIC 202 combines the first flags (flag flag_r1 for R, flag flag_g1 for G, and flag flag_b1 for B) for the respective colors, which indicate the result of detecting the streaked image at the sheet gap for each same position (pixel) in the main scanning direction. Specifically, the image processing ASIC 202 performs a logical OR operation on the first flags for the respective colors for each same position (pixel) in the main scanning direction. With this processing, the image processing ASIC 202 generates a first combined flag flag_rgb1 being combined abnormal image information. In the same manner, the image processing ASIC 202 performs the logical OR operation on the second flags (flag flag_r2 for R, flag flag_g2 for G, and flag flag_b2 for B) for the respective colors, which indicate the result of detecting the streaked image at the leading edge of the original 103 in the conveyance direction. With this processing, the image processing ASIC 202 generates a second combined flag flag_rgb2.

The image processing ASIC 202 compares the generated first combined flag flag_rgb1 and the generated second combined flag flag_rgb2 with each other, and determines the continuity of the streaked images based on the criterion illustrated in FIG. 7. For example, when the streaked images are overlapped at least partially, the image processing ASIC 202 determines that the streaked images continuously extend and are collectively the streaked image due to the foreign matter. In this case, the image processing ASIC 202 sets the relevant pixel as the pixel in which the streaked image has occurred in the streak flag generated in Step S1012.

In FIG. 11, the movement of the foreign matter changes the position of the streaked image between the first flag flag_b1 for B and the second flag flag_b2 for B. However, the image processing ASIC 202 conducts the determination of the continuity based on the result of the logical OR operation, and can therefore determine that the streaked images continuously extend and are caused by the same foreign matter. Therefore, the determination of the continuity of the streaked images can be conducted accurately even when the foreign matter moves.

Second Pattern of Processing for Determining Continuity

Figure 12:
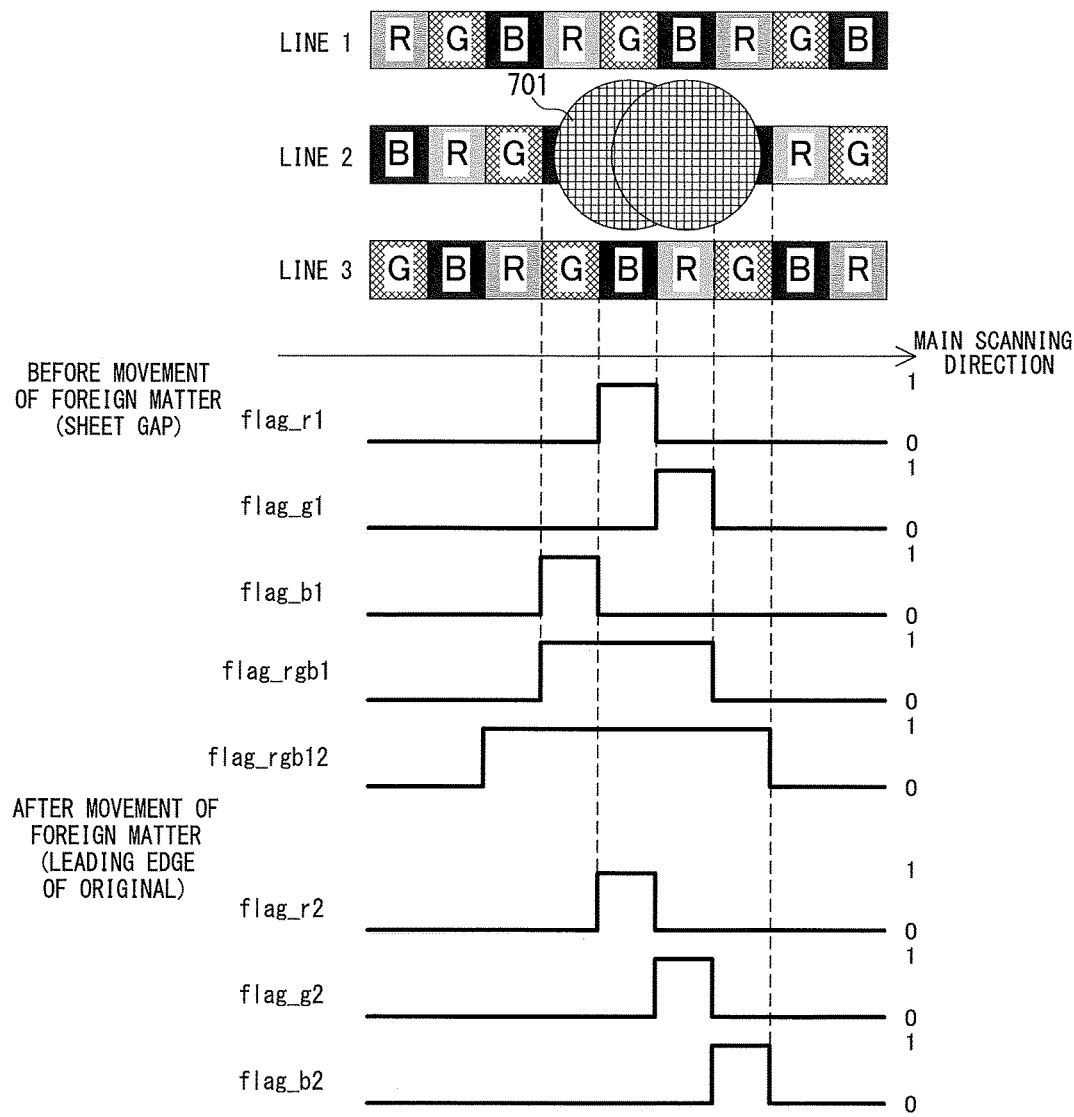
FIG. 12 is an explanatory diagram of the continuity determination for streaked images.

FIG. 12 is an illustration of an example in which, at a time of the determination of the continuity, the logical OR operation is performed only on the first flags for the respective colors, which indicate the result of detecting the streaked image at the sheet gap, while the logical OR operation is not performed on the second flags for the respective colors, which indicate the result of detecting the streaked image at the leading edge of the original 103 in the conveyance direction. Also in FIG. 12, the position of the foreign matter 701 at which the sheet gap is read moves to the position of the foreign matter 702 when the original 103 is read.

The image processing ASIC 202 changes the first combined flag flag_rgb1 being the result of performing the logical OR operation on the first flags for the respective colors, which indicate the result of detecting the streaked image at the sheet gap, so as to extend the width of pixels indicating the presence of the streaked image in the main scanning direction, and uses the result for the determination of the continuity. In this case, the image processing ASIC 202 generates a first combined-and-extended flag flag_rgb12 by increasing the number of pixels of the first combined flag flag_rgb1, which indicate the presence of the streaked image, by one pixel at each of both ends in the main scanning direction. The image processing ASIC 202 compares the first combined-and-extended flag flag_rgb12 with the second flags (flag flag_r2 for R, flag flag_g2 for G, and flag flag_b2 for B) for the respective colors, which indicate the result of detecting the streaked image at the leading edge of the original 103 in the conveyance direction. With this processing, the image processing ASIC 202 determines the continuity of the streaked images. For example, when the pixels indicating the presence of the streaked image are overlapped at least partially, the image processing ASIC 202 determines that the streaked images continuously extend and are collectively the streaked image due to the foreign matter. In this case, the image processing ASIC 202 sets the relevant pixel as the pixel in which the streaked image has occurred in the streak flag generated in Step S1012.

The movement of the foreign matter changes the position of the streaked image between the first flag flag_b1 for B and the second flag flag_b2 for B, but the position of the streaked image indicated by the second flag flag_b2 after the change is also included in the range of the streaked image indicated by the first combined-and-extended flag flag_rgb12. Therefore, the image processing ASIC 202 can determine that the streaked images continuously extend and are caused by the same foreign matter, and the determination of the continuity of the streaked images can be conducted accurately even when the foreign matter moves. With such processing, it is possible to accurately determine the presence of the streaked image at the leading edge of the original 103 in the conveyance direction, which is to be corrected.

Third Pattern of Processing for Determining Continuity

Figure 13:
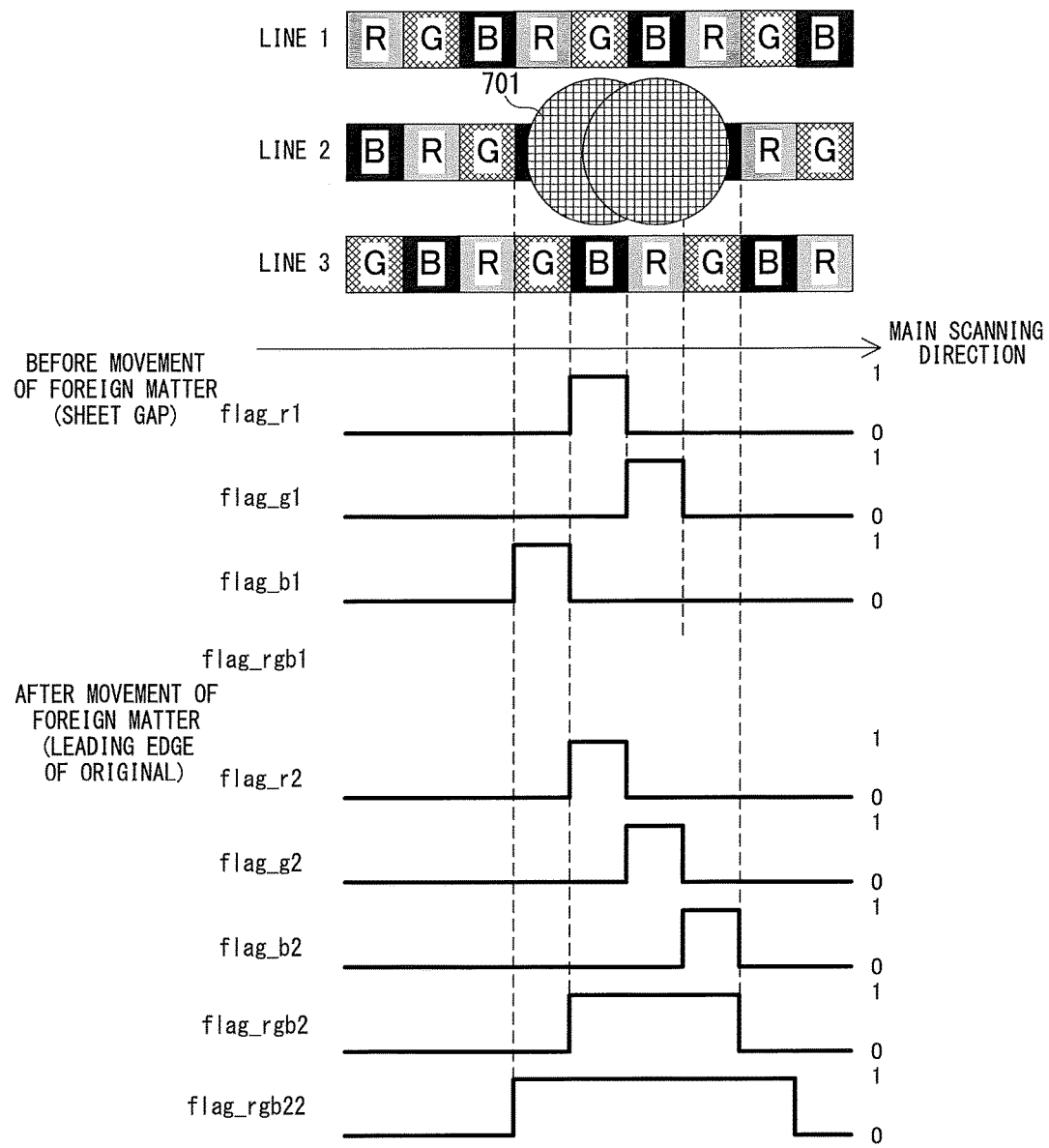
FIG. 13 is an explanatory diagram of the continuity determination for streaked images.

FIG. 13 is an illustration of an example in which, at the time of the determination of the continuity, the logical OR operation is performed only on the second flags for the respective colors, which indicate the result of detecting the streaked image at the leading edge of the original 103 in the conveyance direction, while the logical OR operation is not performed on the first flags for the respective colors, which indicate the result of detecting the streaked image at the sheet gap. Also in FIG. 13, the position of the foreign matter 701 at which the sheet gap is read moves to the position of the foreign matter 702 when the original 103 is read.

The image processing ASIC 202 changes the second combined flag flag_rgb2 being the result of performing the logical OR operation on the second flags for the respective colors, which indicate the result of detecting the streaked image at the leading edge of the original 103 in the conveyance direction, so as to extend the width of pixels indicating the presence of the streaked image in the main scanning direction, and uses the result for the determination of the continuity. In this case, the image processing ASIC 202 generates a second combined-and-extended flag flag_rgb22 by increasing the number of pixels of the second combined flag flag_rgb2, which indicate the presence of the streaked image, by one pixel at each of both ends in the main scanning direction. The image processing ASIC 202 determines the continuity by comparing the second combined-and-extended flag flag_rgb22 with the first flags (flag flag_r1 for R, flag flag_g1 for G, and flag flag_b1 for B) for the respective colors, which indicate the result of detecting the streaked image at the sheet gap. When the pixels indicating the presence of the streaked image are overlapped at least partially, the image processing ASIC 202 determines that the streaked images continuously extend and are collectively the streaked image due to the foreign matter. In this case, the image processing ASIC 202 sets the relevant pixel as the pixel in which the streaked image has occurred in the streak flag generated in Step S1012.

The movement of the foreign matter changes the position of the streaked image between the first flag flag_b1 for B and the second flag flag_b2 for B, but the position of the streaked image indicated by the first flag flag_b1 before the change is also included in the range of the streaked image indicated by the second combined-and-extended flag flag_rgb22. Therefore, the image processing ASIC 202 can determine that the streaked images continuously extend and are caused by the same foreign matter, and the determination of the continuity of the streaked images can be conducted accurately even when the foreign matter moves. With such processing, it is possible to reduce variations of the results of detecting the streaked image due to variations of the streaked image at the leading edge of the original 103 in the conveyance direction.

The image reading apparatus 100 executes the above-mentioned first to third patterns of the processing for determining the continuity by dynamically changing the pattern depending on the state of the streaked image. A service person may set any one of the first to third patterns of the processing for determining the continuity through the operation panel 210 to cause the image reading apparatus 100 to execute the set pattern of the processing. The image processing ASIC 202 conducts the determination processing suitable for the state of the streaked image, for example, the state under which only the fixed streaked images occur, the state under which there is a change of the position of the streaked image, or the state under which the streaked image at the sheet gap is likely to appear to have a large width, based on the state of the adhering foreign matter and the adhesion position of the foreign matter. Therefore, the image processing ASIC 202 can maintain accuracy in detection of the streaked image, and can, as a result, select the processing optimal for an improvement in image quality. In this manner, even when there occurs a change of the state of the streaked image (position and width thereof) while the original is being conveyed to interrupt the strict continuity of the streaked images, the image reading apparatus 100 can detect the streaked images collectively as the same streaked image with high accuracy.

The image reading apparatus 100 described above can accurately detect the streaked image caused by the foreign matter 701 even when the image reading is conducted through use of the line sensor 127 illustrated in FIG. 3. Therefore, it is possible to suppress the overcorrection for the pixel erroneously detected as the streaked image. Further, the image reading apparatus 100 can suitably detect the streaked image even when the foreign matter 701 moves to the position of the foreign matter 702. In this manner, the image reading apparatus 100 can accurately detect the abnormal image caused by the foreign matter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110133, filed Jun. 1, 2016 which is hereby incorporated by reference herein in its entirety.

What is claimed is:

1. An image reading apparatus, comprising:
   a reading unit;
   at least one processor; and
   a memory,
   wherein the reading unit includes:
   a first line sensor including a plurality of light receiving elements which are arranged along a first direction and which include light receiving elements receiving light of a first color and light receiving elements receiving light of a second color different from the first color, and
   a second line sensor including a plurality of light receiving elements which are arranged along the first direction and which include light receiving elements receiving light of the first color and light receiving elements receiving light of the second color, wherein the reading unit is configured to read an image of a target object at a reading position and to generate read data representing the image read by the respective line sensors, wherein the first line sensor and the second line sensor are arranged along a second direction orthogonal to the first direction, and wherein the memory stores instructions which, when executed by the at least one processor, cause the at least one processor to function as:

an abnormal pixel detector configured to detect (i) a first abnormal pixel included in the read data read by the reading unit when the target object does not exist at the reading position, based on pixel data from the first and second line sensors and (ii) a second abnormal pixel included in the read data read by the reading unit when the target object exists at the reading position, based on pixel data from the first and second line sensors, and a combining unit configured to generate at least one of (i) first abnormal pixel information obtained by combining results of detecting the first abnormal pixels and (ii) second abnormal pixel information obtained by combining results of detecting the second abnormal pixels.

2. The image reading apparatus according to claim 1, further comprising a sorter configured to:

generate first color pixel data for the first color by sorting first pixel data from the light receiving elements receiving light of the first color in the first line sensor and second pixel data from the light receiving elements receiving light of the first color in the second line sensor, and generate second color pixel data for the second color by sorting third pixel data from the light receiving elements receiving light of the second color in the first line sensor and fourth pixel data from the light receiving elements receiving light of the second color in the second line sensor, wherein the abnormal pixel detector is configured to detect the first abnormal pixel and the second abnormal pixel based on the first color pixel data and the second color pixel data.

3. The image reading apparatus according to claim 2, wherein the combining unit is configured to perform a logical OR operation on the first color pixel data and the second color pixel data, to thereby generate at least one of the first abnormal pixel information and the second abnormal pixel information, and wherein the first color pixel data represents a position of an abnormal pixel in the first direction based on the first color, and the second color pixel data represents a position of an abnormal pixel in the first direction based on the second color.

4. The image reading apparatus according to claim 1, wherein the abnormal pixel detector is configured to detect an abnormal pixel for each predetermined pixel width in the first direction.

5. The image reading apparatus according to claim 1, wherein the abnormal pixel detector is configured to detect a shadow that occurs at a boundary between the target object and a background, and to detect the second abnormal pixel after waiting for passage of a predetermined number of lines in the second direction.

6. The image reading apparatus according to claim 1, wherein the combining unit is configured to generate both the first abnormal pixel information and the second abnormal pixel information, and wherein the abnormal pixel detector is configured to determine that a pixel, which the second abnormal pixel information indicates is an abnormal pixel, is an abnormal pixel, in a case where a first range overlaps a second range in the second direction, the first range being a range of first abnormal pixels represented by the first abnormal pixel information in the first direction, the second range being a range of second abnormal pixels represented by the second abnormal pixel information in the first direction.

7. The image reading apparatus according to claim 1, wherein the combining unit is configured to generate the first abnormal pixel information, and wherein the abnormal pixel detector is configured to determine that a pixel, which the second abnormal pixel information indicates is an abnormal pixel, is an abnormal pixel, in a case where at least one of the abnormal pixels represented by the second abnormal pixel information is included in a range of first abnormal pixels represented by the first abnormal pixel information in the first direction.

8. The image reading apparatus according to claim 7, wherein the combining unit is configured to combine the results of detecting the first abnormal pixels and to extend a width of pixels indicating presence of the first abnormal pixels in the first direction, to thereby generate the first abnormal image information.

9. The image reading apparatus according to claim 1, wherein the combining unit is configured to generate the by combining the results of detecting the abnormal images of the respective colors in the area second abnormal pixel information, and wherein the abnormal pixel detector is configured to determine that a pixel, which the first abnormal pixel information indicates is an abnormal pixel, is an abnormal pixel, in a case where at least one of the abnormal pixels represented by the first abnormal pixel information is included in a range of second abnormal pixels represented by the second abnormal pixel information in the first direction.

10. The image reading apparatus according to claim 9, wherein the combining unit is configured to combine the results of detecting the second abnormal pixels and to extend a width of pixels indicating presence of the second abnormal pixels in the first direction, to thereby generate the second abnormal image information.

11. The image reading apparatus according to claim 1, wherein the reading unit comprises a third line sensor including a plurality of light receiving elements which are arranged along the first direction and which include light receiving elements receiving light of the first color, light receiving elements receiving light of the second color, and light receiving elements receiving light of a third color different from the first color and the second color, wherein the plurality of light receiving elements in the first line sensor includes light receiving elements receiving light of the third color, wherein the plurality of light receiving elements in the second line sensor includes light receiving elements receiving light of the third color, and wherein the first line sensor, the second line sensor, and the third line sensor are arranged at a predetermined interval along the second direction.

12. The image reading apparatus according to claim 1, further comprising an alert issuer configured to issue an alert in a case where an abnormal pixel is detected by the abnormal pixel detector.

13. The image reading apparatus according to claim 1, wherein the combining unit is configured to combine (i) the detection result of each pixel of the first line sensor and (ii) the detection result of each pixel of the second line sensor at the same position as a respective pixel of the first line sensor, so as to generate at least one of the first abnormal pixel information and the second abnormal pixel information.

14. The image reading apparatus according to claim 1, wherein the first line sensor and the second line sensor are arranged at a predetermined interval along the second direction.

15. The image reading apparatus according to claim 1, wherein the abnormal pixel detector is configured to detect an abnormal pixel based on both read data read by the reading unit and an abnormal pixel threshold value, and
wherein the abnormal pixel threshold value is a value based on read data by the reading unit while reading a white member provided at the reading position in advance.

16. An image forming apparatus, comprising:
a reading unit;
at least one processor;
a memory; and
an image forming unit configured to form an image on a recording medium based on read data read by the reading unit,
wherein the reading unit includes:
   a first line sensor including a plurality of light receiving elements which are arranged along a first direction and which include light receiving elements receiving light of a first color and light receiving elements receiving light of a second color different from the first color, and
   a second line sensor including a plurality of light receiving elements which are arranged along the first direction and which include light receiving elements receiving light of the first color and light receiving elements receiving light of the second color,
   the reading unit being configured to read an image of a target object at a reading position and to generate read data representing the image read by the respective line sensors, and
   the first line sensor and the second line sensor being arranged along a second direction orthogonal to the first direction, and
wherein the memory stores instructions which, when executed by the at least one processor, cause the at least one processor to function as:
   an abnormal pixel detector configured to detect (i) a first abnormal pixel, based on pixel data from the first and second line sensors in an area where the target object does not exist, and (ii) a second abnormal pixel, based on pixel data from the first and second line sensors in an area where the target object exists;
   a combining unit configured to generate at least one of (i) first abnormal pixel information obtained by combining results of detecting the first abnormal pixels and (ii) second abnormal pixel information obtained by combining results of detecting the second abnormal pixels.

17. An image reading method to be executed by an image reading apparatus comprising a reading unit, the reading unit including a first line sensor including a plurality of light receiving elements which are arranged along a first direction and which include light receiving elements receiving light of a first color and light receiving elements receiving light of a second color different from the first color, and a second line sensor including a plurality of light receiving elements which are arranged along the first direction and which include light receiving elements receiving light of the first color and light receiving elements receiving light of the second color, the reading unit being configured to read an image of a target object at a reading position and to generate read data representing the image read by the respective line sensors, and the first line sensor and the second line sensor being arranged along a second direction orthogonal to the first direction, the image reading method comprising:
   detecting (i) a first abnormal pixel included in the read data read by the reading unit when the target object does not exist at the reading position, based on pixel data from the first and second line sensors, and (ii) a second abnormal pixel included in the read data read by the reading unit when the target object exists at the reading position, based on pixel data from the first and second line sensors; and
   generating at least one of (i) first abnormal pixel information obtained by combining results of detecting the first abnormal pixels and (ii) second abnormal pixel information obtained by combining results of detecting the second abnormal pixels.

18. A non-transitory storage medium having stored thereon a computer program for causing a computer to execute processing on data from a reading unit, the reading unit including a first line sensor including a plurality of light receiving elements which are arranged along a first direction and which include light receiving elements receiving light of a first color and light receiving elements receiving light of a second color different from the first color, and a second line sensor including a plurality of light receiving elements which are arranged along the first direction and which include light receiving elements receiving light of the first color and light receiving elements receiving light of the second color, the reading unit being configured to read an image of a target object at a reading position and to generate read data representing the image read by the respective line sensors, and the first line sensor and the second line sensor being arranged along a second direction orthogonal to the first direction, the processing comprising:
   detecting a first abnormal pixel included in the read data read by the reading unit when the target object does not exist at the reading position based on pixel data from the first and second line sensors and a second abnormal pixel included in the read data read by the reading unit when the target object exists at the reading position based on pixel data from the first and second line sensors; and
   generating at least one of (i) first abnormal pixel information obtained by combining results of detecting the first abnormal pixels and (ii) second abnormal pixel information obtained by combining results of detecting the second abnormal pixels.

* * * * *